(12) United States Patent
Delvaux et al.

(10) Patent No.: US 9,936,185 B2
(45) Date of Patent: Apr. 3, 2018

(54) SYSTEMS AND METHODS FOR MERGING DIGITAL CINEMA PACKAGES FOR A MULTISCREEN ENVIRONMENT

(71) Applicant: Barco, Inc., Rancho Cordova, CA (US)

(72) Inventors: Jérôme Delvaux, Liège (BE); Jean-Paul Schafer, Chaudfontaine (BE); Alexander William Gocke, Rancho Cordova, CA (US)

(73) Assignee: Barco, Inc., Rancho Cordova, CA (US)

( * ) Notice: Subject to any disclaimer, the term of this patent is extended or adjusted under 35 U.S.C. 154(b) by 0 days.

(21) Appl. No.: 15/006,767

(22) Filed: Jan. 26, 2016

(65) Prior Publication Data

US 2016/0219264 A1 Jul. 28, 2016

Related U.S. Application Data

(60) Provisional application No. 62/108,303, filed on Jan. 27, 2015.

(51) Int. Cl.
*H04N 7/00* (2011.01)
*H04N 13/00* (2018.01)
(Continued)

(52) U.S. Cl.
CPC ....... *H04N 13/0066* (2013.01); *G11B 27/031* (2013.01); *H04N 9/3147* (2013.01);
(Continued)

(58) Field of Classification Search
CPC ............. H04N 13/0066; H04N 9/3147; H04N 13/0048; H04N 13/0459; H04N 21/21805;
(Continued)

(56) References Cited

U.S. PATENT DOCUMENTS 8,893,192 B1 * 11/2014 Bates ................. H04N 21/2143
386/200
2005/0076372 A1 * 4/2005 Moore ..................... A63J 25/00
725/78
(Continued)

OTHER PUBLICATIONS

PCT Search Report and Written Opinion for PCT/US16/14837 dated Apr. 11, 2016 in 11 pages.

*Primary Examiner* — Michael Lee
(74) *Attorney, Agent, or Firm* — Knobbe, Martens, Olson & Bear, LLP

(57) ABSTRACT

Disclosed herein are systems and methods for packaging, distributing, and utilizing digital cinema packages ("DCPs") with multiple screens or projectors. A merged DCP generation system is disclosed that includes a DCP ingestor module configured to receive and decode a main screen DCP and a peripheral screen DCP, the main screen DCP and the peripheral screen DCP each comprising digital files that include audiovisual information and metadata to enable the presentation of audiovisual content. The system includes a DCP editor module configured to combine the digital files of the main screen DCP and the digital files of the peripheral screen DCP to generate a merged composition playlist ("CPL") comprising reels designating audiovisual content shown on the main screen and the peripheral screen. The system includes a DCP mastering and packaging module configured to generate a merged DCP from the combined digital files and the merged CPL.

12 Claims, 24 Drawing Sheets

(51) Int. Cl.
| | |
|---|---|
| *H04N 9/31* | (2006.01) |
| *H04N 13/04* | (2006.01) |
| *H04N 21/218* | (2011.01) |
| *H04N 21/234* | (2011.01) |
| *H04N 21/2347* | (2011.01) |
| *H04N 21/414* | (2011.01) |
| *H04N 21/854* | (2011.01) |
| *G11B 27/031* | (2006.01) |

(52) U.S. Cl.
CPC ....... *H04N 13/007* (2013.01); *H04N 13/0048* (2013.01); *H04N 13/0059* (2013.01); *H04N 13/0459* (2013.01); *H04N 21/21805* (2013.01); *H04N 21/2347* (2013.01); *H04N 21/23424* (2013.01); *H04N 21/41415* (2013.01); *H04N 21/85406* (2013.01)

(58) Field of Classification Search
CPC ......... H04N 21/23424; H04N 21/2347; H04N 21/85406; G11B 27/031
USPC ........................................................ 348/474
See application file for complete search history.

(56) References Cited

U.S. PATENT DOCUMENTS

| | | |
|---|---|---|
| 2006/0245727 A1 | 11/2006 | Nakano et al. |
| 2008/0281872 A1 | 11/2008 | Mizuno |
| 2009/0172028 A1* | 7/2009 | Benitez ................. G11B 27/10 |
| 2009/0292774 A1 | 11/2009 | Box et al. |
| 2011/0090397 A1* | 4/2011 | Redmann ......... H04N 21/41415 |
| | | 348/468 |
| 2014/0282686 A1 | 9/2014 | Silverman et al. |

* cited by examiner

SYSTEMS AND METHODS FOR MERGING DIGITAL CINEMA PACKAGES FOR A MULTISCREEN ENVIRONMENT

CROSS-REFERENCE TO RELATED APPLICATIONS

This application claims the benefit of priority to U.S. Prov. Pat. App'n No. 62/108,303, filed Jan. 27, 2015, entitled "Systems and Methods for Merging Digital Cinema Packages for a Multiscreen Environment," the entirety of which is incorporated by reference herein.

BACKGROUND

The present disclosure generally relates to packaging digital content for a multi-screen, multi-projector cinema environment.

Digital cinema servers and projectors receive digital content for projection in a theater or other venue. The content can be packaged in one or more digital files for delivery and storage on a media server. The media server can then extract the digital content from the one or more digital files for display using one or more projectors. In some cases, the content can be 3D video projected onto a screen where slightly different visual content is projected for simultaneous observation in the right and left eyes of a viewer to create the illusion of depth. A multi-projection system can be used to display video on a plurality of screens in a venue, such as in a theater or auditorium, to facilitate an immersive experience for the viewer.

SUMMARY

Typically, movie theaters provide a single screen for viewing projected video content. The video content can be digitally stored as a package of digital files on a media server that the media server decodes to provide to the projector. However, such single-screen projector systems are not configured to provide multi-view content (e.g., media streams designed to be projected onto a plurality of screens). Indeed, combining a plurality of single-screen projector systems to enable presentation of multi-view content presents a number of challenges. For example, in some cases, content is delivered as digital cinema packages ("DCPs"), which include highly encrypted content used in conjunction with, security elements, such as key delivery mechanisms ("KDMs") and/or digital key distribution masters ("D-KDMs") to limit the playback of DCP content to certain times. As such, managing and/or delivering the DCPs can add several layers of complexity. In some cases, delivering content for each of the multiple screens, and synchronizing such content, may require the use of a plurality of tools for extracting, digesting, and displaying content. For example, such tools may include files, keys, certificates, authentication algorithms, software, and/or hardware. In order to implement these tools, additional processing, system management, and/or servers may be needed. The addition of these layers of complexity may introduce errors and/or system slow down, as well as increase costs. Accordingly, systems and methods are provided herein for packaging content for multiple screens in a digital theater having two or more projectors with security elements.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

For illustrative purposes, embodiments of this disclosure are described with reference to DCPs and/or other files described in the Digital Cinema Initiatives ("DCI") Specification. However, a person having ordinary skill in the art should appreciate that systems and methods of this disclosure may be applied to any file format used to deliver and/or package digital cinema content such as, but not limited to, REDCODE, Tagged Image File Format ("TIFF"), Tag Image File Format/Electronic Photography ("TIFF/EP"), Digital Negative files ("DNG"), Extensible Metadata Platform files ("XMP"), Exchangeable image file format ("Exif"), etc.

An immersive display system can include a plurality of projection systems arranged to provide immersive viewing of video. Such an immersive display system can include a plurality of projector systems that each projects video wherein video frames from each video are synchronized with one another. Each projector system can be configured to project its video onto a projection surface placed around an audience. In this way, the audience can experience a sense of immersion into the environment depicted in the video. Synchronized video provided by the plurality of projector systems may be projected on the plurality of projection surfaces creating a unified video presentation. Such immersive display systems are capable of generating audiovisual presentations with a relatively high level of realism due at least in part to video being simultaneously presented to the viewer from many directions.

Figure 1:
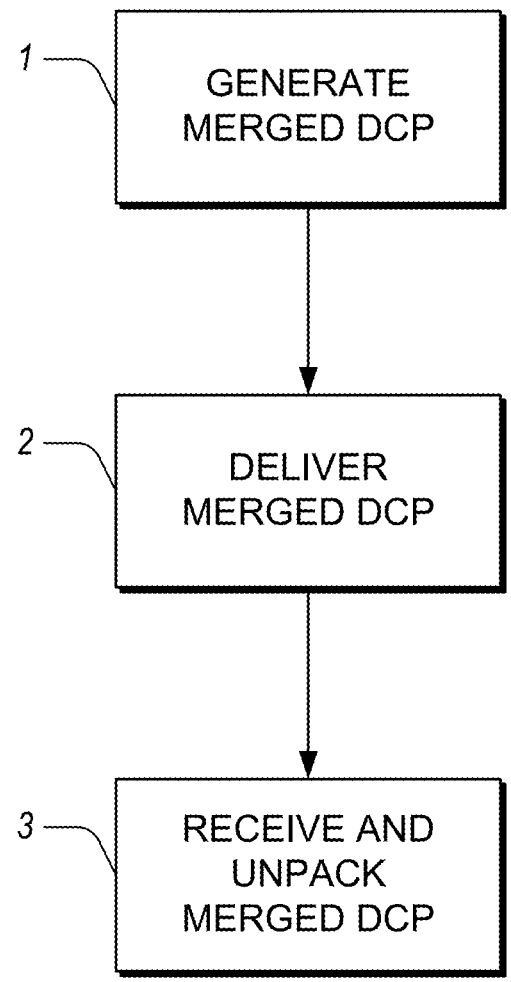
FIG. 1 illustrates a flowchart of an example method of generating a merged DCP, delivering a merged DCP, and receiving and unpacking a merged DCP.

FIG. 1 illustrates a flowchart of an example method of managing multiple digital cinema packages ("DCPs") configured for synchronized presentation through the use of a merged DCP. As used herein, the term DCP includes, but is not limited to, a digital package that includes data and/or files that contain audiovisual information as well as metadata wherein the digital package is configured to enable the presentation of audiovisual content, such as a movie, advertisement, trailer, or the like. A DCP can conform to standards set by the DCI or another entity. In some embodiments, the DCP adds or removes elements to the standards set by the DCI. As used herein, the term merged DCP includes, but is not limited to, a digital package that includes a plurality of DCPs, wherein at least one of the plurality of DCPs is intended for presentation on a main screen (e.g., a main screen DCP) and at least one of the plurality of DCPs is intended for presentation on a peripheral or extended screen (e.g., an extended screen DCP) in synchronization with the main screen DCP. The method includes the steps of generating a merged DCP, delivering a merged DCP, and receiving and unpacking a merged DCP. Each step in the method can be performed by a single system and/or module or by a combination of systems and/or modules. Similarly, two or more steps may be performed by a single system and/or module. The method can be performed using a combination of software and hardware, as described in greater detail herein.

Figure 2:
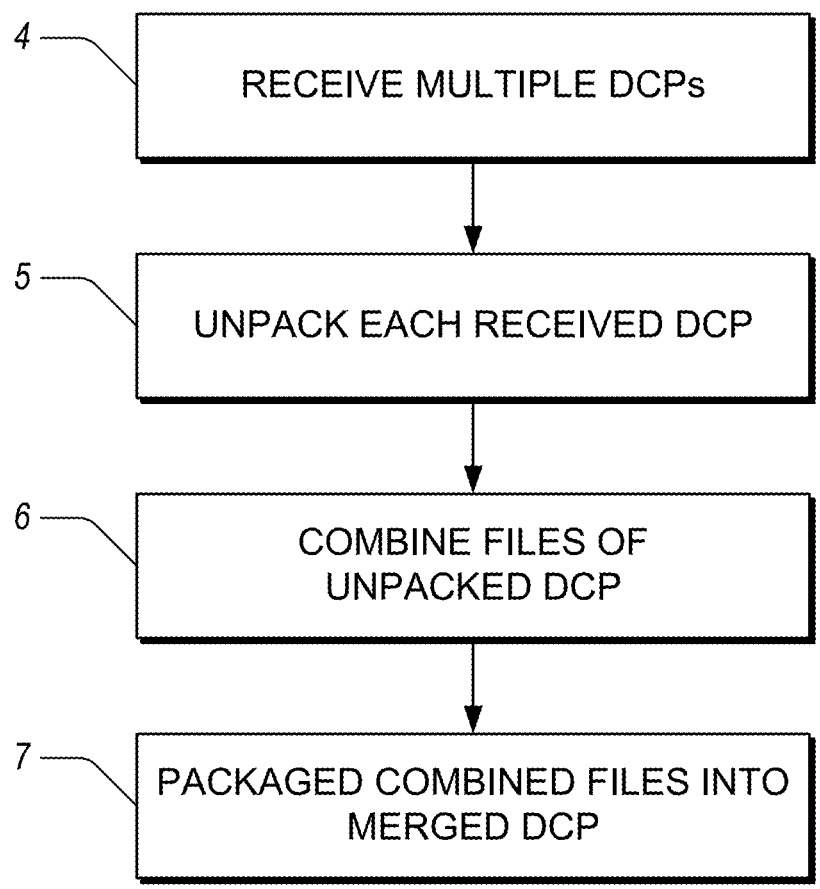
FIG. 2 illustrates a flowchart of an example method for generating a merged DCP.

In block 1, a merged DCP is generated. To generate the merged DCP, multiple DCPs can be combined into a single digital package. An example method for generating a merged DCP is illustrated in FIG. 2. With reference to FIG. 2, a merged DCP may be generated using software and/or hardware post-production (e.g., at a production studio, a producer, a third party production company, a cinema, a server, a projector, and/or any place with the software and/or hardware to generate the merged DCP). In some cases, a digital source master ("DSM") may be created post production and converted into digital cinema initiative distribution masters ("DCDMs"). The DCDMs may be packaged into a DCP. Typically, each DCP may contain the content for a single screen. In block 4, the merged DCP generator receives the multiple DCPs, which may be DCPs with content for each screen in a multiple screen cinema environment. In block 5, each of the received DCPs is unpacked. In some cases, unpacking the multiple DCPs may include decoding each of the DCPs (e.g., with a KDM and/or D-KDM) into separate cinema files. In block 6, the files of the unpacked DCPs are combined. A merged composition playlist ("CPL") may also be generated, wherein the merged CPL lists the audiovisual content (e.g., files) that should be played on a designated screen at a time. Finally, in block 7, the combined files are packaged into a merged DCP. Accordingly, the merged DCP may comprise the files from each separate DCP. In some embodiments, the merged DCP can combine files from separate DCPs where appropriate. In such circumstances, the merged DCP can include a file that indicates which files should be associated with each DCP, where a file can be associated with one or more DCPs. The merged DCP may also be encoded/encrypted with keys and/or certificates and/or other security mechanisms. A merged D-KDM and/or KDMs may then include corresponding keys and/or certificates to decode/decrypt the merged DCP to extract the cinema files.

Returning to FIG. 1, in block 2, the merged DCP from block 1 is delivered. The merged DCP may be delivered using conventional cabling, including, for example, HDMI cables, component cables, composite video cables, coaxial cables, Ethernet cables, optical signal cables, fiber optic cables, other video cables, or any combination of these. The merged DCP may be delivered using wireless techniques and/or a combination of wired and wireless techniques. In some embodiments, the merged DCP may be digital information stored on, a readable medium, including hard disks, solid-state drives ("SSDs"), optical discs, flash memory devices, and the like. For example, files may be stored on a CRU DX115, CRU DCmini, and/or other hard drives for digital movie distribution. The readable medium can be physically transported from one location to another to deliver the merged DCP (or multiple merged DCPs). In some cases, the merged DCP may be transmitted/transported from the location of generation to the location of unpacking and/or playback. Other files may be delivered simultaneously or at different times from the merged DCP. For example, a merged D-KDM or KDMs may be delivered to decode the merged DCP.

Figure 3:
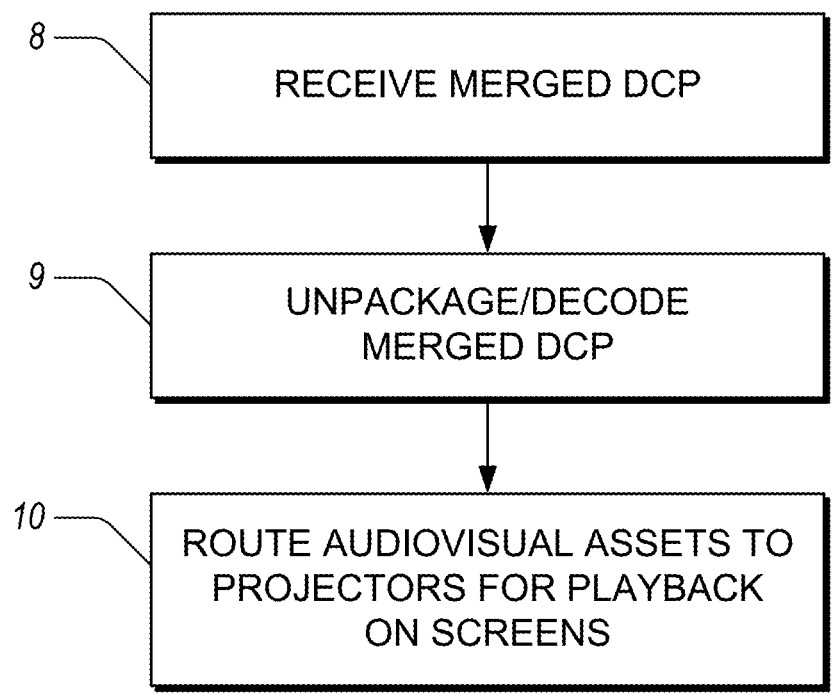
FIG. 3 illustrates a flowchart of an example method for receiving and unpacking a merged DCP.

In, block 3, the merged DCP from block 2 is received and unpacked. FIG. 3 illustrates a flowchart of an example method for receiving and unpacking a merged DCP. In block 8, a merged DCP is received. For example, the merged DCP may be received at a cinema, theater, studio, and/or any venue for playback and/or editing of cinema content. More particularly, the merged DCP may be received by a projector, theater management system ("TMS"), screen management system ("SMS"), server, processor, and/or any location that may receive the merged DCP. Other files may be received with the merged DCP. For example, merged D-KDM and/or KDMs may be delivered to decode the merged DCP.

In block 9, the merged DCP is unpacked/decoded, wherein the files are extracted from the merged DCP packaging. This unpacking may occur in software and/or hardware by a projector, TMS, SMS, server, processor, and/or any location that may receive the merged DCP. In some cases, other received files may be used in conjunction with the received merged DCP. For example, the merged D-KDM and/or KDMs and/or certificates and/or other security mechanisms may be used to decode the merged DCP. The files for the audiovisual content may be content for two or more screens, such as in a multi-screen cinema environment. A merged CPL may be extracted from the merged DCP, wherein the merged CPL lists the audiovisual content (e.g., files) that should be played on a designated screen at a time. The merged CPL may then be used by the projector, TMS, SMS, server, processor, and/or any location that may receive content for playback on screens. In block 10, the system receiving and/or unpacking the merged DCP (e.g., the projector, TMS, SMS, server, processor, and/or any location that may receive the merged DCP) routes the audiovisual assets of the merged DCP to the respective screens (e.g., designated by the CPL or other file in the merged DCP) for playback.

Figure 4:
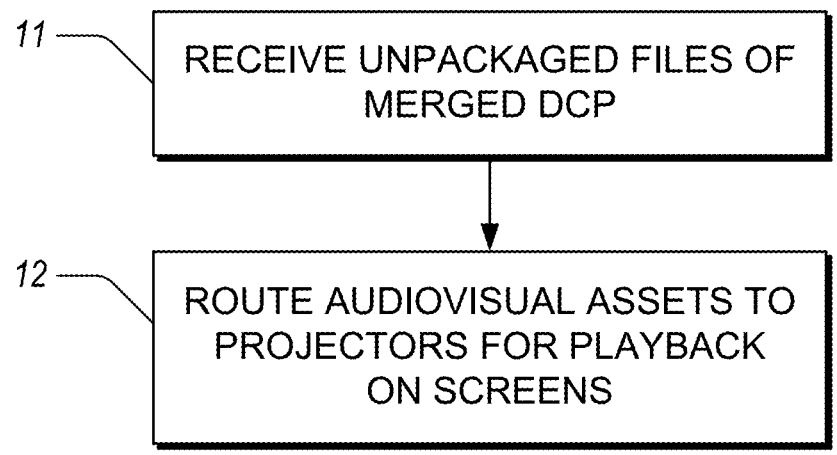
FIG. 4 illustrates a flowchart of an example method for receiving the files of a merged DCP and routing the cinema content to projectors for playback.

In some embodiments, the receiving server and/or another server may split the files of the merged DCP to files for each of the two or more screens for playback (e.g., into DCPs such as the main screen DCP and/or extended screen DCP). These files may be encoded or decoded. For example, FIG. 4 illustrates a flowchart of a method for receiving the files of a merged DCP and routing the cinema content to projectors for playback. In block 11, a system (e.g., the projector, TMS, SMS, server, processor, and/or any other system in a cinema) receives the unpackaged files of a merged DCP. The files may be encoded or decoded. Where the files are encoded, the system may decode the files using keys, certificates, and/or other security mechanisms. In block 12, the system routes the audiovisual assets (e.g., extracted files) to projectors for playback on screens.

Figure 5:
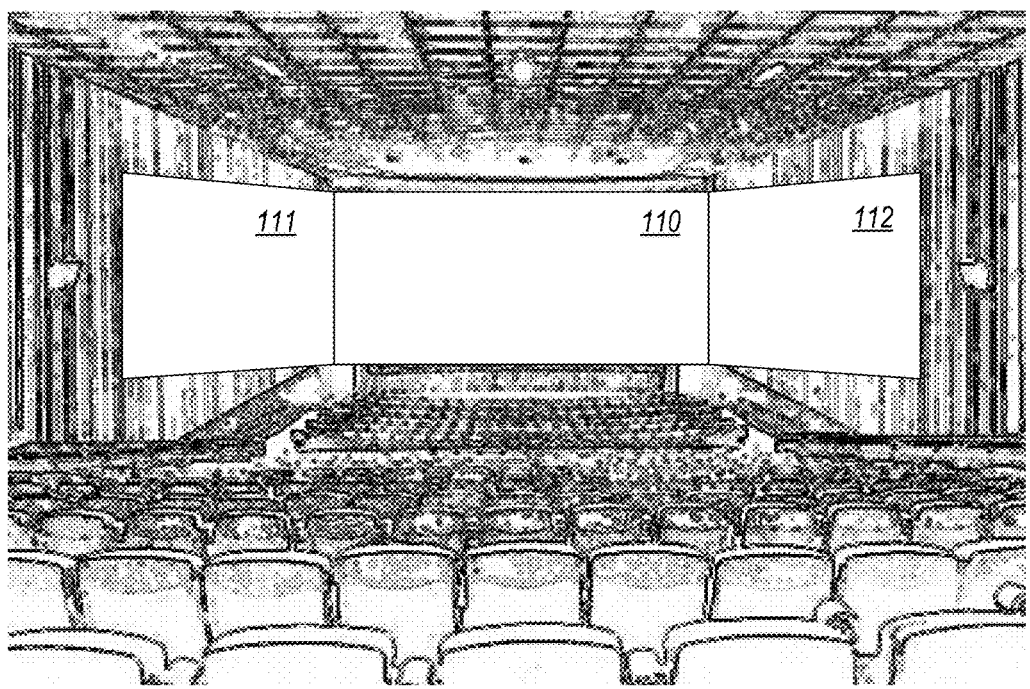
FIG. 5 illustrates an example multi-screen cinema environment having front, left, and right screens.

FIG. 5 is an illustration of an example multi-screen cinema environment having front, left, and right screens. Front screen 110 is a screen located in front of the audience. Left side screen 111 and right side screen 112 are screens located to the sides of the audience. In some cases, when the content displayed on front screen 110, left side screen 111, and right side screen 112 are coordinated, an immersive cinema experience may be created for the audience.

Figure 6:
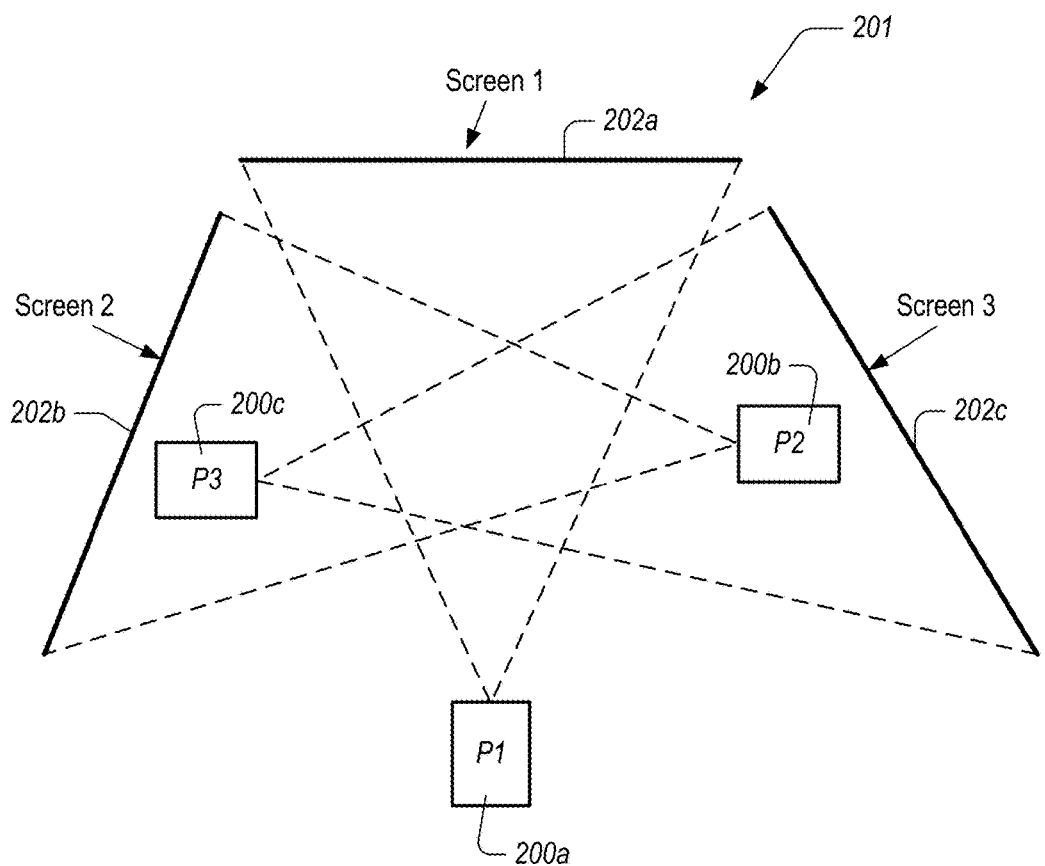
FIG. 6 illustrates a top-view of an example three projector system used with the multi-screen cinema environment illustrated in FIG. 5.

FIG. 6 is a top-view illustration of an example three projector system used with the multi-screen cinema environment illustrated in FIG. 5. Display system 201 includes projectors 200*a-c*. Each of projectors 200*a-c* is configured to project video onto one of screens 202*a-c*. For example, projector 200*a* projects video onto screen 202*a*, projector 200*b* projects video onto screen 202*b*, and projector 200*c* projects video onto 202*c*.

Solely for illustrative purposes, a few non-limiting examples of projector systems are described in this disclosure. However, embodiments may be implemented on a variety of systems and are not tied to any specific way of setting up the projectors and screens. In this way, embodiments may be said to be projector system agnostic.

Also, while some embodiments of this disclosure may be described as three projector, three screen systems for illustrative purposes, this disclosure is readily adaptable to display systems having a number of projectors and screens not equal to three. For example, embodiments of this disclosure may be used in display systems that can include 2, 3, 4, 5, 6, 7, 8, 9, 10, or more than 10 projectors. The display system can also include 2, 3, 4, 5, 6, 7, 8, 9, 10, or more than 10 screens. In some cases, multiple projectors may be used for a single screen and/or a single projector may project on multiple screens.

In some embodiments, each of projectors 200*a-c* may operate independently of one another. For example, each projector may independently receive media content (e.g., DCPs), the contents of which each projector decrypts and projects onto screens 202*a-c*, respectively. In some embodiments, each of projectors 200*a-c* may be connected in parallel to a central distribution system that distributes content to each of projectors 200*a-c*. The central distribution system may receive, media content (e.g., DCPs), decrypt it (e.g., using a KDM), and/or distribute it among projectors 200*a-c*. The central distribution system may also receive coded and/or decoded files from a merged DCP and send audiovisual assets to desired projectors based on those files (e.g., by extracting and sending those files and/or by generating content based on the files). In some cases, the central distribution system may be configured to read a merged CPL, which designates which audiovisual assets should be played on a screen at a time. The central distribution server may send files to the corresponding projectors based on the designations of the merged CPL. It may also synchronize projectors 200*a-c* using a synchronization signal, timing signals, and/or other synchronization means.

Figure 7:
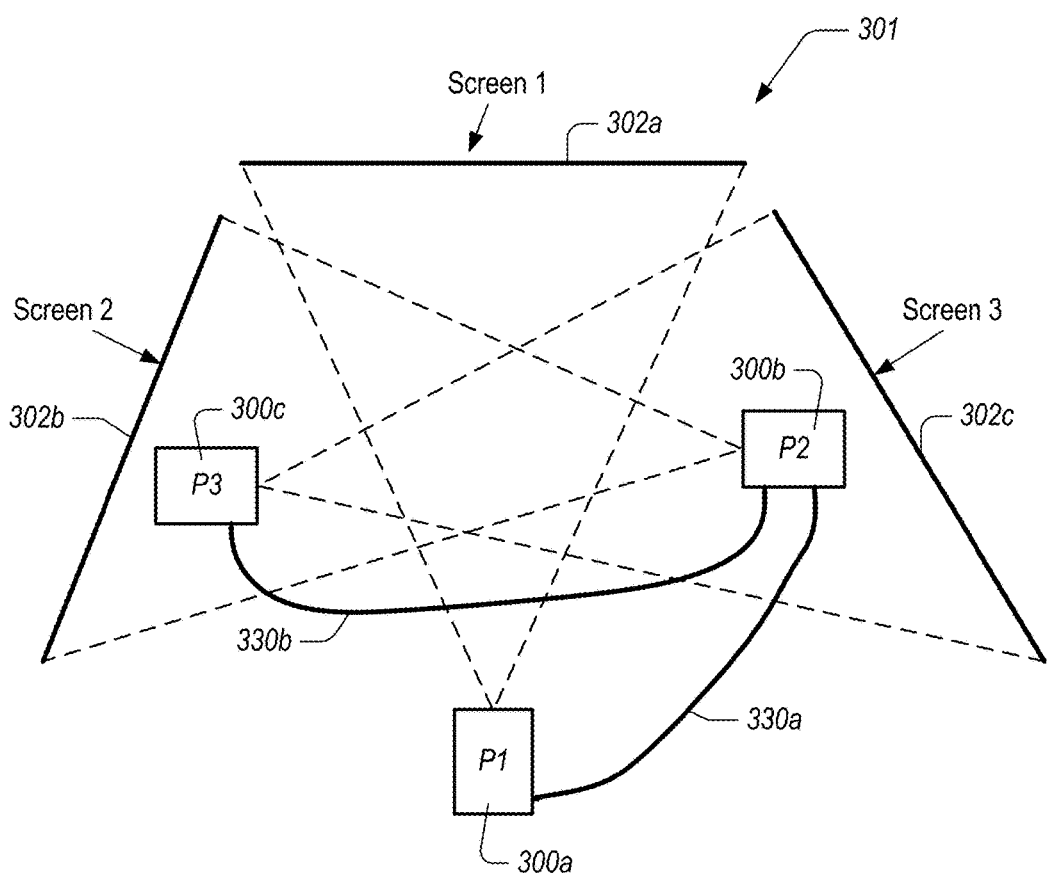
FIG. 7 illustrates a projector system having a master projector and slave projectors.

As another example, FIG. 7 illustrates a projector system having a master projector and slave projectors. As used herein, the master projector or the master media server provides the synchronization signal to which the slave projectors synchronize their output. Master projector 300*a* ingests, decodes, and/or provides the main audiovisual presentation in the immersive display system 301. For example, the master projector may also receive coded and/or decoded files from a merged DCP and send audiovisual assets to desired projectors based on those files (e.g., by extracting and sending those files and/or by generating content based on the files). In some cases, the master projector may be configured to read a merged CPL, which designates which audiovisual assets should be played on a screen at a time. The master projector may send files to the corresponding projector based on the designations of the merged CPL. Projectors 300*b* and 300*c* are slave projectors. As used herein, a slave projector or slave media server provides images synchronized to the master projector synchronization based at least in part on the synchronization signal provided by the master projector. A slave projector may provide video that is projected peripherally, adjacently, near, and/or otherwise complementary to the video provided by the master.

Master projector 300*a* may transmit a synchronization signal over the cabled connection 330*a* to a first slave projector (e.g., projector 300*b*) that then transmits the same synchronization signal over the cabled connection 330*b* to a second slave projector (e.g., projector 300*c*). The synchronization signal is the same or substantially the same for all projector systems to enable globally synchronized video in the immersive display system. Accordingly, due at least in part to projectors 300a-c projecting video based on the synchronization signal, a synchronized video presentation is provided on the screens 302a-c. As used herein, synchronized video includes video from different projectors having corresponding frames that are displayed within a sufficiently small time window from one another so as to be displayed substantially simultaneously. In some embodiments, synchronized video includes video wherein corresponding frames are displayed such that a time between the display of the synchronized frames is less than or equal to about 1 ms, less than or equal to about 500 μs, less than or equal to about 350 μs, less than or equal to about 250 μs, or less than or equal to about 200 μs. Such synchronization can be referred to as having sub-frame accuracy in its synchronization. For example, for a video that has a frame rate of 30 fps (or 60 fps), each frame of video is displayed for about 33.3 ms (or 16.7 ms). Videos that are synchronized to within a fraction of the time a video frame is displayed can be said to have sub-frame accuracy. For example, sub-frame accuracy can include synchronization that has a latency between corresponding frames that is less than about 10% of the frame rate, less than about 5% of the frame rate, less than about 1% of the frame rate, or less than about 0.1% of the frame rate.

In some embodiments, master projector 300a can control display of a video in units of frames and synchronize the video frames from projector 300b and 300c using a time code for each frame. Accordingly, projectors 300a-c can accurately synchronize the video projected on screens 302a-c based at least in part on the time code for each frame in the synchronization signal. A further description of this system and other systems are disclosed in U.S. Provisional No. 62/069,720 to Duyvejonck et al. and U.S. Provisional No. 62/087,191 to Gocke, each of which is incorporated herein by reference.

Figure 8:
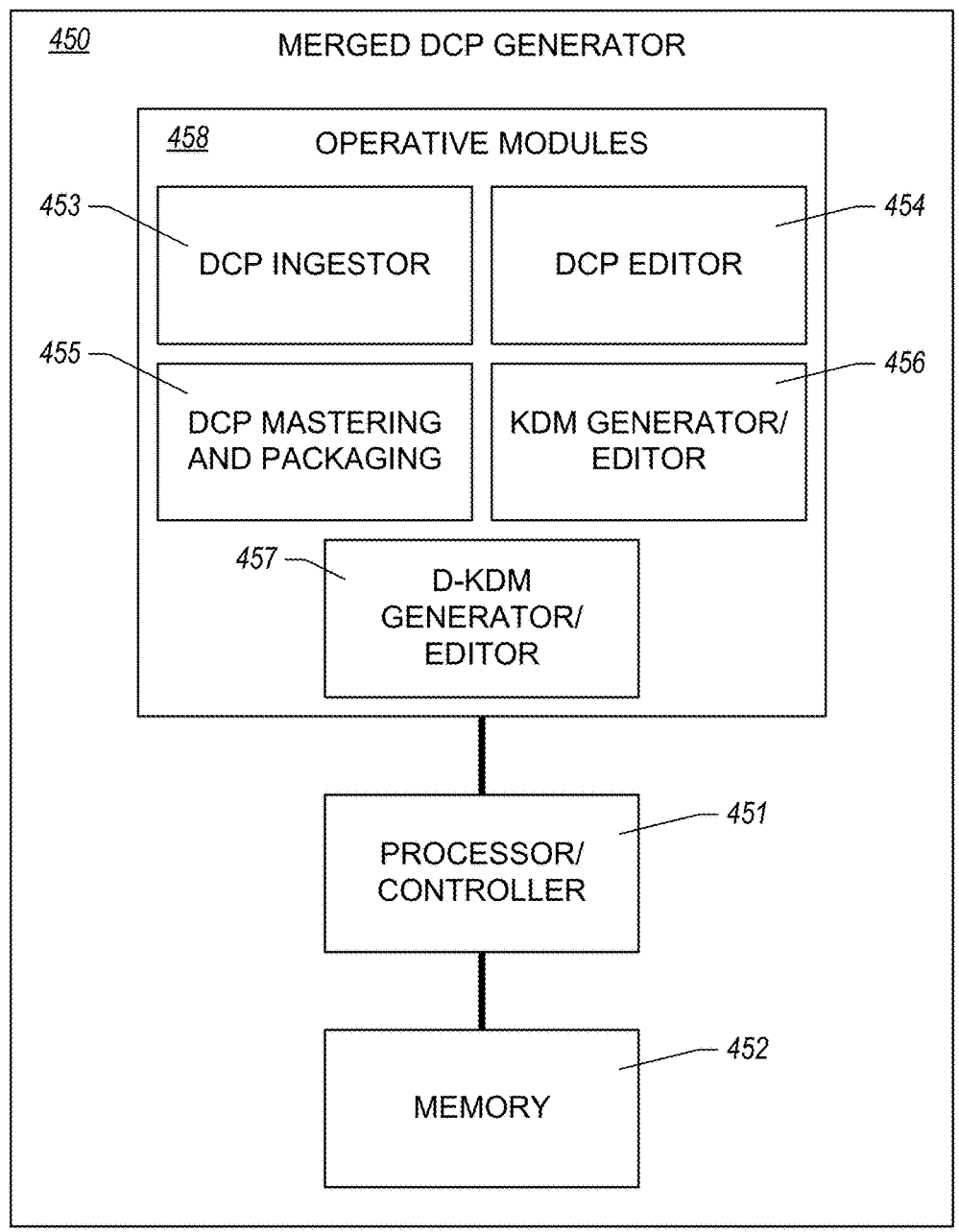
FIG. 8 illustrates a functional block diagram of an example embodiment of a merged DCP generator for viewing content on a main screen and extended screens.

Several embodiments relating to systems and methods of delivering cinema content to a multi-screen, multi-projector environment, such as any of the environments described above, will now be described herein. FIG. 8 illustrates a functional block diagram of an example embodiment of a merged DCP generator for viewing content on a main screen and extended screens. For example, the main screen may be a front screen (e.g., front screen 110 (FIG. 5), screen 202a (FIG. 6), and screen 302a (FIG. 7)). Extended screen may be additional/peripheral screens, such as side screens (e.g., left side screen 111 (FIG. 5), right side screen 112 (FIG. 5) screens 202b-c (FIG. 6), and screens 302b-c (FIG. 7)). Merged DCP generator 450 includes processor/controller 451 that controls the basic operations of merged DCP generator 450. Processor/controller 451 may be coupled to memory 452, which may include both read-only memory (ROM) and random access memory (RAM), and may provide instructions and data to processor/controller 451. A portion of memory 452 may include non-volatile random access memory (NVRAM). Processor/controller 451 typically performs logical and arithmetic operations based on program instructions stored within memory 452. Instructions in memory 452 may be executable to implement the methods described herein. Operative modules 458 may be coupled to processor/controller 451. Data from the components in operative modules 458 may be processed and/or analyzed by processor/controller 451 in order to coordinate their functionality. These modules may include, for example, a DCP ingestor, a DCP editor, DCP mastering and packaging, a KDM generator/editor, and/or a D-KDM generator/editor. The modules may be implemented in hardware and/or software. For example, the modules may comprise circuit logic hardwired into a system configured to generate a merged DCP. The modules may also be soft-coded into a computer program.

DCP ingestor 453 may be used to decrypt and/or decode the digital content in one or more DCPs. In some cases, DCP ingestor 453 extracts the DCPs to material exchange format ("MXF") files, DCDM files, J2K frames, sound and/or video content files, and/or any file format mentioned in this disclosure and/or used to deliver cinema content. As used herein, DCDMs may take any form, and embodiments of this disclosure are not limited to any format of DCDMs. DCDMs may be generated by a DSM. DCDMs are generally defined in the DCI specification, which became a technology standard for distribution/screening of digital movies. In some cases, DCDMs may be files that represent video (e.g., moving image content) for electronic playback in a cinema and/or theaters. The files can be uncompressed or compressed and unencrypted or encrypted. The DCDMs may contain the theater presentation itself, along with other content such as trailers and advertisements, and metadata cues for screen and/or projector actions (e.g., motion, turning on/off, and synchronization). The files of the DCDMs, or "tracks," may contain images (high resolution representations of motion picture frames, often produced by scanning film), audio, subpictures and/or timed text (mainly subtitles and/or captions), and auxiliary data (which includes such things as data to control room lights and curtains in a theater). Content of the DCDMs may be divided into "reels," which are segments of picture and sound. DCDMs may utilize a hierarchical structure that provides imagery at both 2 k (2048×1080 pixels), 4 k (4096×2160 pixels), and/or any other resolution in order to serve projectors with different capabilities. The files of the DCDMs may typically comprise digital picture ("DPX") files or tagged image file format ("TIFF") files. Digital cinema content used according to the DCI specification may conform to a standard for compressed moving picture (e.g., Wavelet, Moving Picture Experts Group ("MPEG")-high definition ("HD"), or Joint Photographic Experts Group ("JPEG")-2000) having a high resolution of 2K (2048*1080) or 4K (4096*2048), and may conform to standards such as a DCP for encrypting and distributing the content and a KDM for transferring decryption information. MXF files may be files created in accordance to standards set by the Society of Motion Picture and Television Engineers. Similarly, the J2K frames may be files created in accordance to standards released by Joint Photographic Experts Group.

In some embodiments, DCP ingestor 453 may use one or more KDMs, which may contain the encrypted keys to decrypt the DCPs as well as the certificate and/or signature for verification. In some cases, one or more D-KDMs may be delivered instead of KDMs. The D-KDMs may control the DCP for copying and/or modification, and for creation of KDMs. KDM generator/editor 456 may be used to edit, create, and/or receive KDMs. Similarly, D-KDM generator/editor 457 may be used to edit, create, and/or receive KDMs. In some cases, it may generate KDMs from D-KDM. DCP editor 454 may be used to edit one or more DCP files. For example, DCP editor 454 may merge files of one or more DCPs, edit the CPLs of the DCPs and/or edit other files of the DCPs as will be described. In some cases, DCP editor 454 may combine (e.g., merge) the files such that the video content is synchronized. For example, it may create a merged CPL that matches video content for the screens based at least in part on time codes for each frame, reel numbers, and/or frame numbers. The merged CPL may include an ordered sequence of reels, each referencing sound, picture, or other files to be played. In other words, in some cases, the merged CPL may be a script that controls the order and place (e.g., screens) that content in the DCPs are played. In some embodiments, the merged CPL may use designations such as file naming conventions in order to signify which content should be displayed on each screen in the multi-screen environment. Such a naming convention further allows merged DCP generator 450 to be viewing system agnostic. For example, a merged DCP for a multi-screen environment may still, be played on a standard single screen auditorium by ignoring extended screen tracks. Lastly, DCP mastering and packaging module 455 may package the merged files into a merged DCP.

Figure 9:
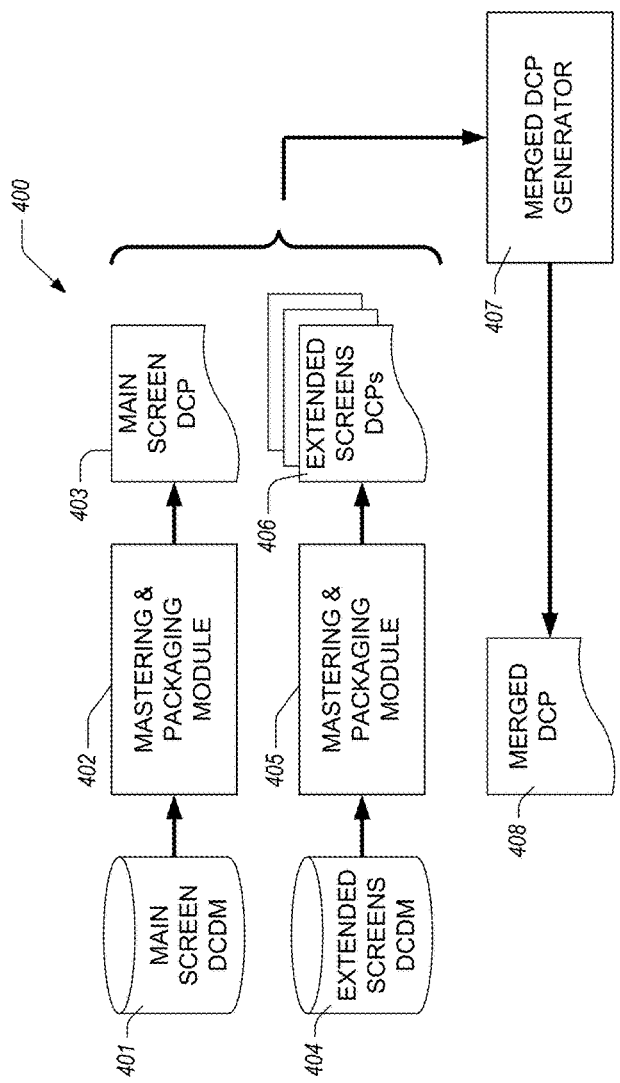
FIG. 9 illustrates a high-level diagram of an example embodiment of a plaintext merged digital cinema package generation system for main screen and extended screen content.

FIG. 9 illustrates a high-level diagram of an example embodiment of a plaintext merged digital cinema package generation system 400 for main screen and extended screen content. Initial video content may be stored on DCDMs. In some embodiments, there may be a main screen DCDM and extended screens DCDM (e.g., for additional screens and/or peripheral screens). For example, main screen DCDM 401 may contain files for playback on the main screen of a theater system. The files can be uncompressed or compressed and unencrypted or encrypted. It may also encode additional information for playback such as the aspect ratio of the video content. In some cases, the aspect ratio may be the scope, which can be a ratio of 2.35:1, 2.39:1, 2:40:1 or any other format used in cinema formats, including aspect ratios of up to 2.66:1.

Extended screens DCDM 404 may similarly contain files for video playback of the extended screens (e.g., additional screens or side screens). The files can be uncompressed or compressed and unencrypted or encrypted. Extended Screen DCDM 404 may contain additional information for playback. For example, it may encode the aspect ratio, as described above. It may also contain cues for events such as turning off an extended screen at a particular time. For example, extended screens DCDM 404 may encode when an extended screen is expected to be blank (e.g., off) for the full duration of a reel and/or any portion of a reel.

Main screen DCDM 401 may then be passed through master and packaging module 402, which encodes main screen DCDM 401 into main screen DCP 403. Similarly, extended screens DCDM 404 may be passed through mastering and packaging module 405 to generate extended screens DCPs 406, which may include a DCP for each extended screen. DCPs are a collection of the digital files typically wrapped into MXF files. They are typically used to deliver cinema content to theaters. Main screen 403 and extended screens DCPs 406 may be plaintext (e.g., a file that can be read without the need of decryption), wherein no encryption is used. In other cases, as will be described later in this disclosure, DCPs may be encrypted packages.

Figure 10:
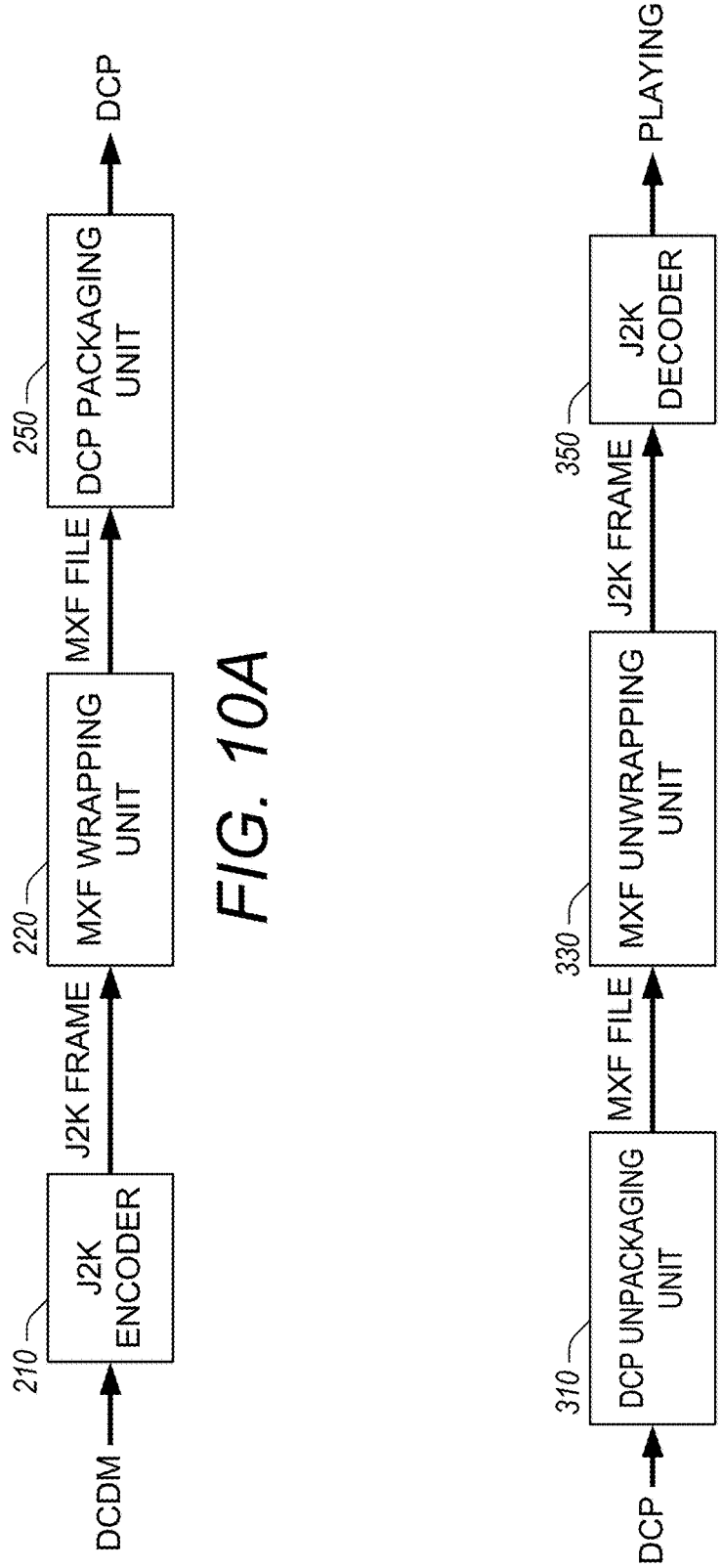
FIG. 10A illustrates a high-level diagram of an example mastering and packaging module for plaintext DCPs.
FIG. 10B illustrates a high level diagram of an example system for ingesting a plaintext DCP.

For illustrative purposes, FIG. 10A is a high-level diagram of an example mastering and packaging module for plaintext DCPs. A mastering and packaging module (e.g., mastering and packaging modules 402 and/or 405) may include J2K encoder 210 that receives a DCDM (e.g., main screen DCDM 401 and/or extended screens DCDM 404). J2K encoder 210 generates a J2K frame by encoding the DCDM. For example, J2K encoder may be software and/or a module made in accordance to the Still Image Compression Standard released by Joint Photographic Experts Group. The J2K frame is transferred to MXF wrapping unit 220 to generate an MXF file.

DCP packaging unit 250 receives the MXF file and generates a DCP, which, can be distributed to a showing server. The DCP may contain auxiliary index files. For example, the DCP may also contain a CPL, which may contain a list of image, sound, and/or subtitle files that may provide instructions on how elements of the DCP should be played in a presentation. In some cases, the CPL may describe which files of the DCP should be presented at a time, and which tracks (e.g., image, sound, and/or subtitles) will be played at that time. The DCP may also contain a packing list ("PKL"), which may contain the hash values of all files in the composition. The PKL may be used during ingestion of the DCP to verify if data has been corrupted and/or tampered. The DCP may also contain an asset map ("AM"), which may list all files included in the DCP. The DCP can later be decrypted, unpackaged, and decompressed to reveal the DCDM for playback.

FIG. 10B illustrates a high level diagram of an example system for ingesting a plaintext DCP. DCP unpackaging unit 310 may parse a DCP and output an MXF file to an MXF unwrapping unit 330 which unpacks the MXF files into J2K frames. Then, MXF unwrapping unit 330 outputs the unpacked J2K frame to a J2K decoder 350 which extracts the cinema content for playing.

Returning to FIG. 9, main screen DCP 403 and extended screens DCPs 406 are inputted into merged DCP generator 407. DCP generator 407 is a downstream application that is configured to issue a merged DCP based on inputted DCPs (e.g., main screen DCP 403 and extended screens DCPs 406). Merged DCP generator 407 may combine the files of each DCP. For example, merged DCP generator 407 may receive each of main screen DCP 403 and extended screens DCPs 406 and then merges the extracted files (e.g., MXF files, DCDM files, J2K frames, sound and/or video content files, and/or any file format mentioned in this disclosure and/or used to delivery cinema content) into a new, merged set of files. The files may be extracted using a DCP ingestor (e.g., DCP ingestor 453 of FIG. 8) and merged using a DCP editor (e.g., DCP editor 454 of FIG. 8).

A merged CPL may be similarly generated, which controls the order and timing of the play-out of the reels. The merged CPL too may be created by a DCP editor (e.g., DCP editor 454 of FIG. 8). In some embodiments, the picture and text elements of the CPL of main screen DCP 403 may be merged "as is" into the merged CPL. In other cases, the picture and text elements of the CPL of main screen DCP 403 may be merged into the merged CPL as main elements, designated for the main screen. For example, a naming convention, as will be later described, may be used to identify which elements should be played on the main screen. Similarly, the picture and text elements of the CPL of the extended screen DCPs 406 may be merged into the merged CPL as extended elements, designated as for the extended screens, or "as is."

The merged CPL may also be created from main screen DCP 403 and extended screens DCP 406 based at least in part on time codes for each frame, reel numbers, and/or frame numbers for the files of main screen DCP 403 and extended screens DCP 406. For example, merged DCP generator may decode the time code for one or more files of main screen DCP 403 and extended screens DCP 406. The contents may be synchronized with subframe accuracy. In some cases, where the times codes of contents of files are the same, those contents will be synchronized on the same reel. In some cases, where the time codes for files may not be the same, merged DCP generator 406 may place contents with substantially similar time codes in the same reel, such as contents with time codes that are different by less than the display time of a frame. In some cases, merged DCP generator may also add in blank frames to the displayed content of files of main screen DCP 403 and extended screens DCP 406 so that they may be synchronized accordingly. Similar methods may be used for synchronizing the contents of files of main screen DCP 403 and extended screens DCP 406 by frame numbers, reel numbers, and/or any other characteristic of video content. In this way, the content for the multi-screen environment may be coordinated/synchronized so that the desired content is displayed on the desired screen at the desired time.

The CPL may use identifiers, such as naming file conventions, in order to signify what content should be displayed on each screen in the multi-screen environment. Such identifiers further allows merged DCP generator 450 to be viewing system agnostic. For example, a merged DCP for a multi-screen environment may allow the merged DCP to be played in a variety of extended screens by allowing playback systems to assign the content with a given identifier to a particular screen (e.g., the system may play files identified as "Extended" on a left screen, a right screen, and/or any desirable screen). Moreover, content may still be played on a standard single screen auditorium by ignoring extended screen tracks.

Figure 11:
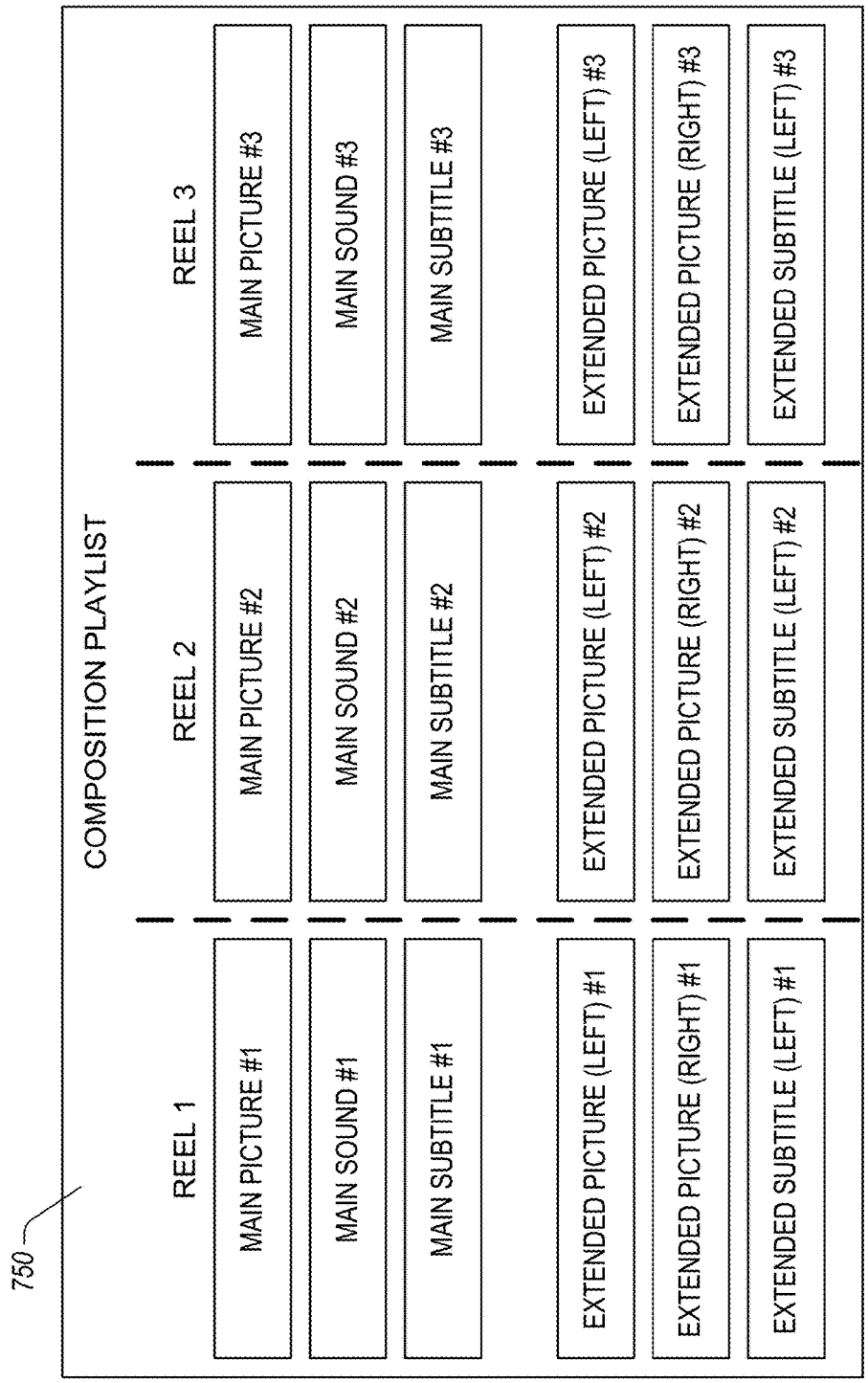
FIG. 11 illustrates an, example merged composition playlist with files designated for a main, left, and, right screen.

FIG. 11 illustrates an example merged CPL with files designated for a main, left, and right screen. CPL 750 comprises a plurality of reels, including reels 1, 2, and 3. In some embodiments the files in each reel of CPL 750 may have designations. In some cases, the designations may be naming conventions, such as asset-type extensions. For example, ExtendedPicture may be used for a 2D video asset for extended (e.g., additional) screens. ExtendedStereoscopicPicture may be used for a 3D video asset for extended screens. ExtendedSubtitle may be used to for subtitle assets for extended screens. Further, ExtendedScreen may be used to identify the screen to display the extended asset. Similar extensions may be used for the main screen. For example MainPicture may be used for a 2D video asset for the main screen. MainSteroscopic may be used for a 3D video asset for the main screen. MainSubtitle may be used for subtitle assets for the main screen. And MainScreen may be used to identify the screen to display the main assets. Additionally, MainSound may be used for the sound of the main screen.

As illustrated in FIG. 11, each of the reels describe segments of picture, sound, and other elements (e.g., subtitles) that should be shown on cinema screens at a time. For example, reel 1 may contain segments of picture and sound for a main screen and left and right extended screens. As an illustrative example, reel 1 may comprise MainPicture #1, MainSound #1, MainSubtitle #1, ExtendedPicture (LEFT) #1, ExtendedPicture (RIGHT) #1, and ExtendedSubtitle (LEFT) #1. In this way, reel 1 describes that the main screen should display MainPicture #1, MainSound #1 and MainSubtitle #1. At the same time, ExtendedPicture (LEFT) #1 and ExtendedSubtitle (LEFT) #1 should be displayed on the left extended screen, and ExtendedPicture (RIGHT) #1 should be displayed on the right extended screen. Similarly, reel 2 may comprise MainPicture #2, MainSound #2, MainSubtitle #2, ExtendedPicture (LEFT) #2, ExtendedPicture (RIGHT) #2, and ExtendedSubtitle (LEFT) #2. And reel 3 may comprise MainPicture #3, MainSound #3, MainSubtitle #3, ExtendedPicture (LEFT) #3, ExtendedPicture (RIGHT) #3, and ExtendedSubtitle (LEFT) #3. In this way, CPL 750 may list and/or direct the content of the cinema presentation.

A person having ordinary skill in the art should appreciate that the asset-type extensions using "Main" and "Extended" are merely illustrative, and any name, letter, number, character, code, or combinations thereof may be used. A person having ordinary skill in the art should also appreciate that there are a variety of other identifiers that may be used including metadata, lists, addresses, dot operators, classes, pointers, and/or any other way of identifying a file known in the art.

The DCP editor (e.g., DCP editor 454 of FIG. 8) may issue merged CPL a new universally unique identifier ("UUID") that can be used to identify it during extraction. The merged CPL reels similarly get assigned new UUIDs.

Returning again to FIG. 9, in some embodiments, merged DCP generator 407 may also have certain constraints that may create errors and/or warnings if not met. For example, merged DCP generator 407 (including, e.g., DCP ingestor 453, DCP editor 454, and/or DCP mastering and packaging module 455 of FIG. 8) may require that main screen DCP 403 and extended screens DCPs 406 have compatible characteristics for merger. For example, merged DCP generator 407 may produce errors/warnings if main screen DCP 403 and extended screens DCPs 406 do not have: an equal number of reels, the same total duration and same reel durations, the same edit rates, and/or the same frame rates. DCP generator 407 may also produce errors/warnings if each asset referenced in the PKLs and AMs of main screen DCP 403 and/or extended screens DCPs 406 are not present. In some cases, errors/warnings may occur when different types of DCPs are used. For example, error/warnings may occur if some of the DCPs are plaintext and others are encrypted. In some cases, errors/warnings may also be issued if the aspect ratios of the picture of the DCPs are not the same.

Lastly, a DCP mastering and packaging module of merged DCP generator 407 (e.g., mastering and packaging module 455 of FIG. 8) may package the merged files, including the merged CPL, into merged DCP 408. Merged DCP 408 may then be delivered to a cinema for multi-screen playback.

Figure 12:
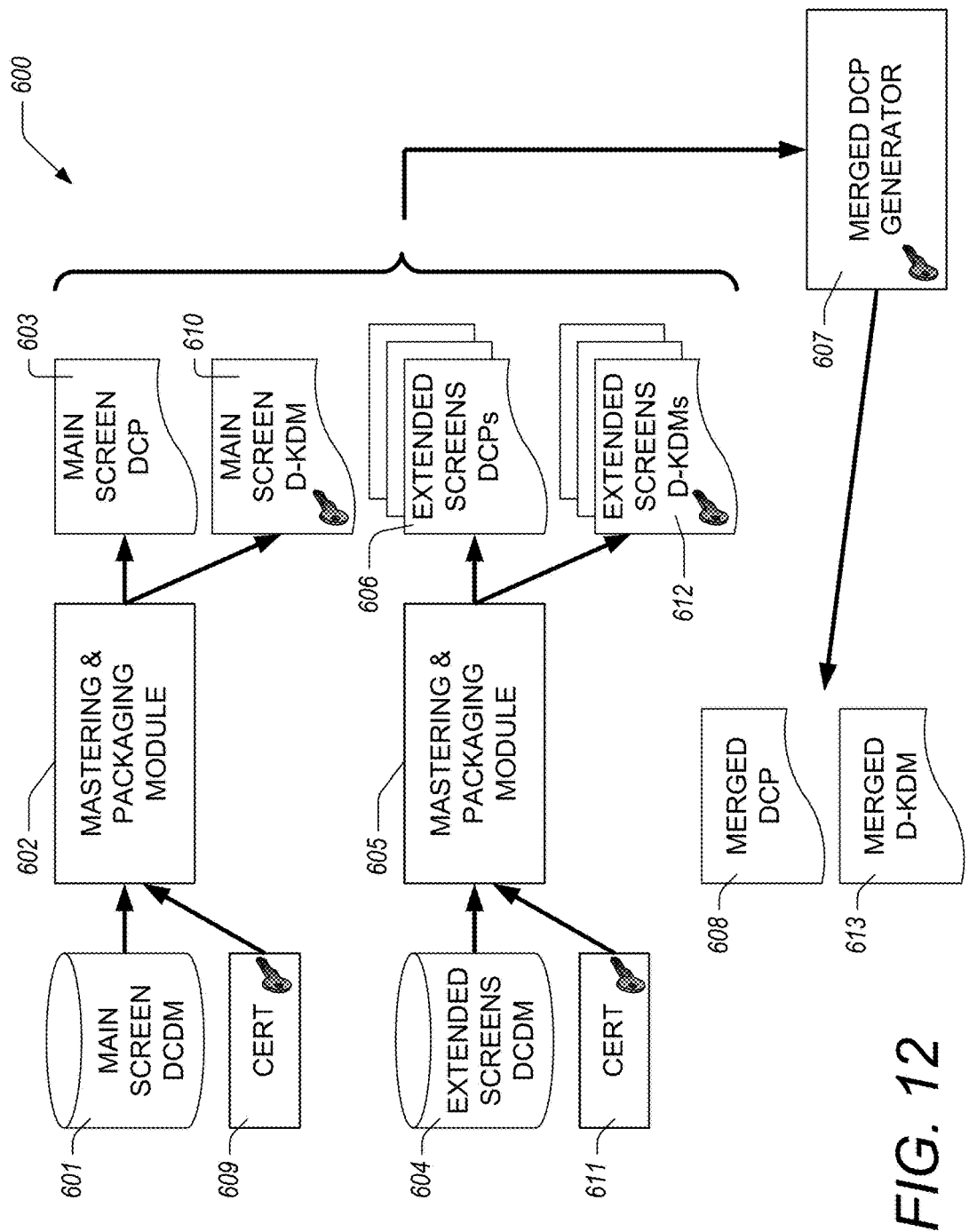
FIG. 12 illustrates an embodiment having a merged DCP generation system using internal keys.

FIG. 12 illustrates an embodiment having a merged DCP generation system using internal keys. Main screen DCDM 601, which may be similar to main screen DCDM 401 (FIG. 9), is inputted into mastering and packaging module 602. Main certificate 609 is also inputted into mastering and packaging module 602. Main certificate 609 may be a certificate of DCP generator 607 and/or other security elements. For example, main certificate 609 may identify the servers that may decrypt main screen DCP 603 using main screen D-KDM 610. Similarly, extended screen DCDM 604 and extended certificate 611 may be inputted into mastering and packaging module 605. Similar to main certificate 609, extended certificate 611 may be a certificate of merged DCP generator 607 and/or other security elements. It may identify the servers that may decrypt extended screens DCPs 606 using extended screens D-KDMs 612.

Figure 13A:
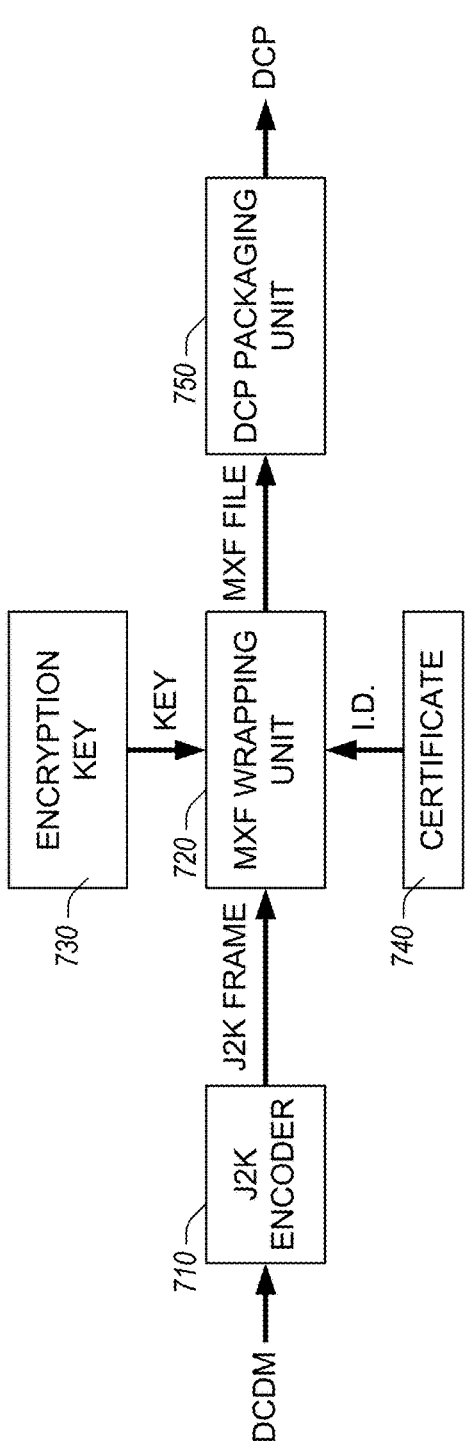
FIG. 13A illustrates a high-level diagram of an example mastering and packaging module for DCPs using certificates.

Mastering and packaging module 602 and 605 may be similar to mastering and packaging module 402 (FIG. 8), described above. FIG. 13A illustrates a high-level diagram of an example mastering and packaging module for DCPs using certificates. Mastering and packaging modules (e.g., mastering and packaging modules 602 and 605) may include J2K encoder 710 that receives a DCDM (e.g., main screen DCDM 601 and/or extended screens DCDM 604). J2K encoder 710 generates a J2K frame by encoding the DCDM and transferring the J2K frame to a MXF wrapping unit 720.

An encryption key 730 may be used for encrypting the MXF file in MXF wrapping unit 720. In some cases, encryption key 730 may be a private key internal to merged DCP generator 607. Encryption key 730 may also be an external key inputted into MXF wrapping unit 720, a key generated by a key generator, and/or any other key. As a non-liming example, in some cases, the files may be encrypted by using encryption algorithms described in the Advanced Encryption Standard ("AES"). The files may also be encrypted using other encryption methods known in the art, including methods utilizing hashing, symmetric encryption, and asymmetric encryption. Keys may also be private and/or public and utilized to encrypt and decrypt data. For example, the private and public keys may be part of a private/public key pair, where the public key is used to encrypt data and is widely distributed, and the private key is known to some (e.g., servers, modules, software, and/or hardware) that can decrypt the information.

Certificate 740 may also be used for encrypting an MXF file in MXF wrapping unit 720. Certificate 740 may be a digital file (e.g., a *.crt or *.pem file) that is unique to a DCP server, A KDM and/or D-KDM issued for a certain certificate can only be used by the DCP server corresponding to that certificate. MXF wrapping unit 720 receives the J2K frame, key, and/or I.D., and generates an MXF file containing the image, sound, and metadata of the video presentation that may only be accessed using the appropriate key and/or I.D.

DCP packaging unit 750 receives the MXF file and generates a DCP and a D-KDM. The DCP may also contain a CPL, such as any CPL described in this disclosure. The D-KDM may control the DCP for copying and modification, and creation of KDMs, which may contain the encryption key for the DCP as well as the certificate and signature for verification. The KDMs and/or D-KDMs may be used in the creation of the DCP and also to enable playback of the cinema content. In some embodiments, KDMs and/or D-KDM may be formatted for decryption at a mastering station or on a cinema server. They may utilize a single key system, two key system, or a system using any number of keys including 3, 4, 5, 6, 7, 8, 9, 10 or more keys.

Figure 13B:
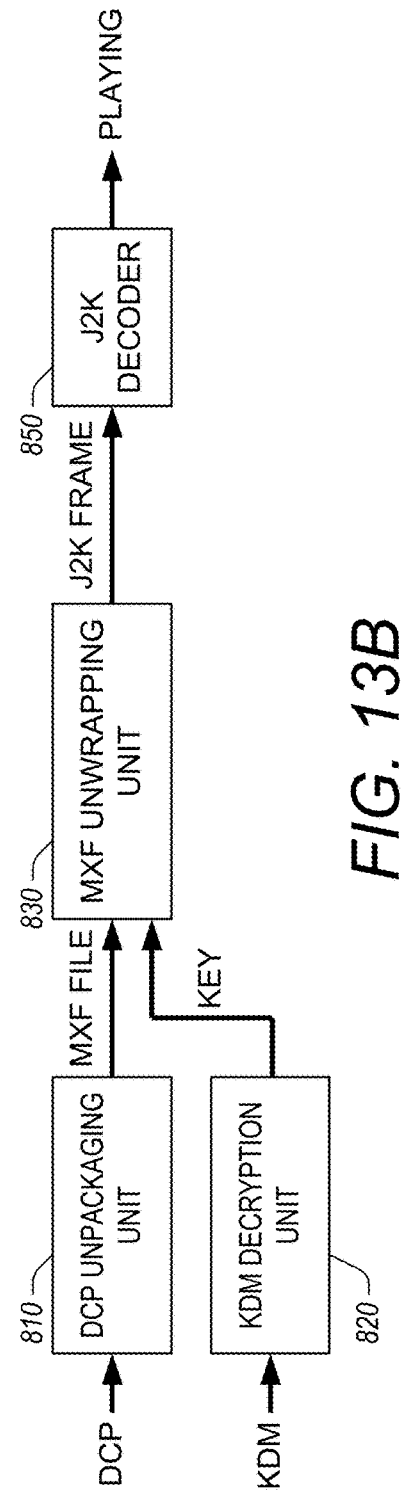
FIG. 13B illustrates a high-level diagram of an example system for extracting and decrypting the content from a DCP.

The DCP can later be decrypted, unpackaged, ingested, and/or decompressed to reveal the DCDM for playback. FIG. 13B illustrates a high level diagram of an example system for extracting and decrypting the content from a DCP. DCP unpackaging unit 810 parses a DCP and outputs an MXF file to an MXF unwrapping unit 830. A KDM decryption unit 820 parses a KDM and outputs a decryption key to the MXF unwrapping unit 830. The MXF unwrapping unit 830 extracts and decrypts the MXF files. MXF unwrapping unit 830 outputs the received J2K frame to J2K decoder 850. The J2K frame, decoded by J2K decoder 850, is then played.

Returning to FIG. 12, main screen DCP 603, main screen D-KDM 610, extended screens DCPs 606, and extended screens D-KDMs 612 may be passed to merged DCP generator 607, which may merge the DCPs and the security features of the files to streamline certification and decryption.

For example, merged DCP generator 607 may merge main screen D-KDM 610 and extended screen D-KDM 612 into one or more KDMs and/or D-KDMs for decrypting the content of all of the aforementioned DCPs. Merged DCP generator 607 may perform such a merger using a KDM generator/editor module (e.g., KDM generator/editor 456 from FIG. 8) and/or a D-KDM generator/editor (e.g., D-KDM generator/editor 457 from FIG. 8). If main certificate 609 and extended certificate 611 were certificates of merged DCP generator 607, merged DCP generator 607 may decrypt the essence keys (e.g., encryption keys and/or decryption keys) from main screen D-KDM 610 and extended screens D-KDM 612, which in turn may be used to decrypt main DCP 603 and extended screen DCPs 606, respectively. In some cases, merged DCP generator 607 may include an internal private key that may be used to decode the essence keys. DCP generator 607 may merge all the extracted KDMs and/or D-KDMs into a single merged D-KDM 613, which may then be used for decrypting the cinema content.

Merged DCP generator 607 may also merge DCP and CPL files using systems and methods similar to merged DCP generator 407 (FIG. 9) and merged DCP generator 450 (FIG. 8), as described above. Merged DCP generator 607 may similarly have a DCP mastering and packaging module (e.g., DCP mastering and packaging module 455 of FIG. 8). It may also package the DCP using encryption keys and certificates of DCP generator 407. For example, the package may be later decrypted using servers identified by certificates and/or keys in merged D-KDM 613. Merged DCP generator 607 may then output the merged DCP files as Merged DCP 608 and the merged KDMs and/or D-KDMs as merged D-KDM 613.

Merged DCP generator 607 may also have similar constraints as Merged DCP Generator 407 (FIG. 9) and produce similar errors/warnings, as described above. Additionally, it may also produce errors/warnings when not all the asset keys needed to decrypt cinema content are present in main screen D-KDM 610 and extended screens D-KDMs 612.

Figure 14:
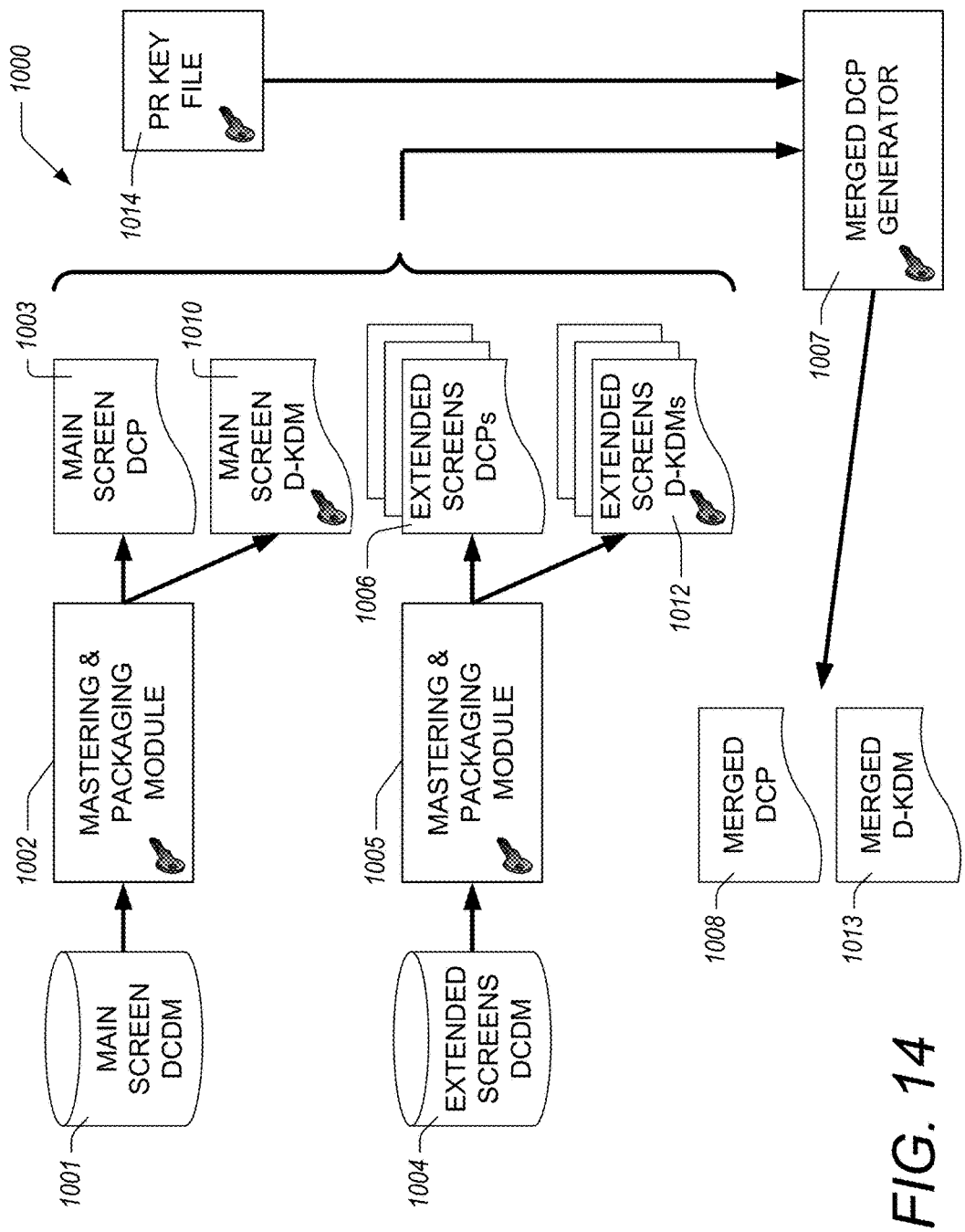
FIG. 14 illustrates a high-level diagram of an example merged DCP generation system that uses an external private key.

FIG. 14 illustrates a high-level diagram of an example merged DCP generation system that uses an external private key. Main screen DCDM 1001 and extended screens DCDM 1004 are inputted into mastering and packaging module 1002 and 1005, respectively. Mastering and packaging module 1002 and 1005 may use an external certificate corresponding to PR key file 1014. In this way, PR key file 1014 may be able to decrypt files generated by mastering and packaging module 1002 and 1005. Mastering and packaging module 1002 and 1005 may operate using substantially similar systems and methods to mastering and packaging modules 455, 402, 405, 602, and/or 605 as described throughout this disclosure. Mastering and packaging module 1002 may then output main screen DCP 1003 and main screen D-KDM 1010. Similarly, mastering and packaging module 1005 may output extended screens DCPs 1006 and extended screens D-KDMs 1012.

PR key file 1014 may be an external private key (e.g., a *.pem file) used to decrypt main screen D-KDM 1010 and extended screens D-KDMs 1012, which may in turn be used to decrypt main screen DCP 1003 and extended screens DCPs 1006. The key may be used with a MXF wrapping unit and/or DCP packaging unit as described above with reference to FIG. 13A. DCP generator 1007 merges the files of the D-KDMs into a merged D-KDM 1013, which may then be used for decrypting the cinema content.

Merged DCP generator 1007 may merge the DCP and CPL files using systems and methods similar to merged DCP generator 450 (FIG. 8), merged DCP generator 407 (FIG. 9) and DCP generator 607 (FIG. 12) described above. The merged DCP file may be outputted as merged DCP 1008. Merged DCP generator 1007 may also have similar constraints as merged DCP generator 407 (FIG. 9) and merged DCP generator 607 (FIG. 12), described above.

Figure 15:
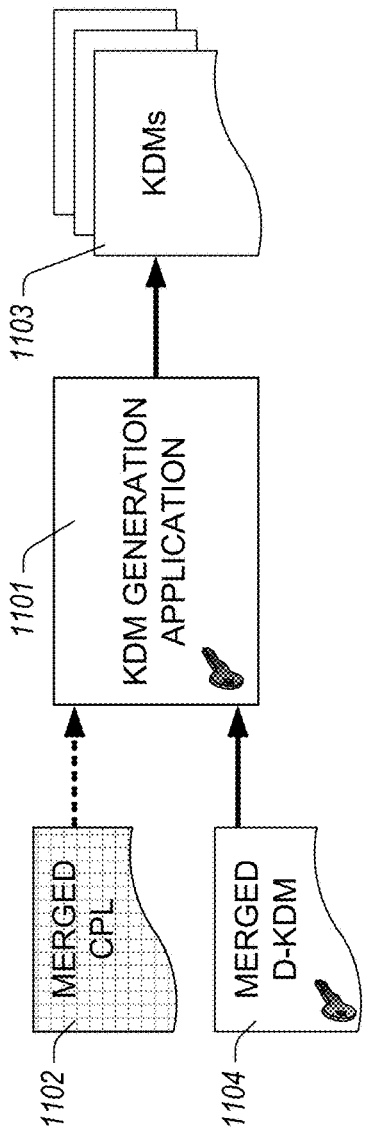
FIG. 15 illustrates an application that can be used to generate KDMs from a merged D-KDM and/or a merged composition playlist.

FIG. 15 illustrates an application that can be used to generate KDMs from a merged D-KDM and/or a merged composition playlist. KDM generation application 1101 may be configured to generate KDMs 1103 based on merged CPL 1102 and/or merged D-KDM 1104. KDM generation application 1101 may host the private key (e.g., internal or external keys) of merged D-KDM 1104. KDMs 1103 may comprise the encrypted keys, and the certificates and signatures for verification to view the content of DCPs (e.g., merged DCPs, main DCPs, and/or extended DCPs) on targeted devices. In some embodiments, KDM generation application 1101 may host its own private keys (e.g., so it can, decrypt merged D-KDM asset elements) and/or hosts a private key of merged D-KDM 1104. In some cases, the private key may be a secret key that is placed in secured storage, such as in a tamper-resistant environment in a server. KDM generation application 1101 may be software implemented in a computer program. It may also be hardwired into circuit logic as a KDM generation module.

Figure 16:
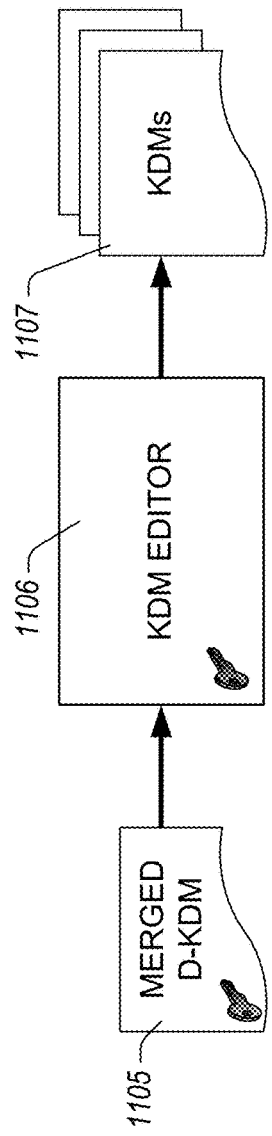
FIG. 16 illustrates example KDM editor that can be used to generate KDMs from merged D-KDMs.

FIG. 16 illustrates example KDM editor that can be used to generate KDMs from merged D-KDMs. The downstream application, KDM editor 1106, may receive merged D-KDM 1105. KDM editor 1106 may host a private key, which it may use to decrypt the D-KDM essence key elements and output KDMs 1107. KDM editor 1106 may be software implemented in a computer program. It may also be hardwired into circuit logic as a KDM editor module.

Figure 17:
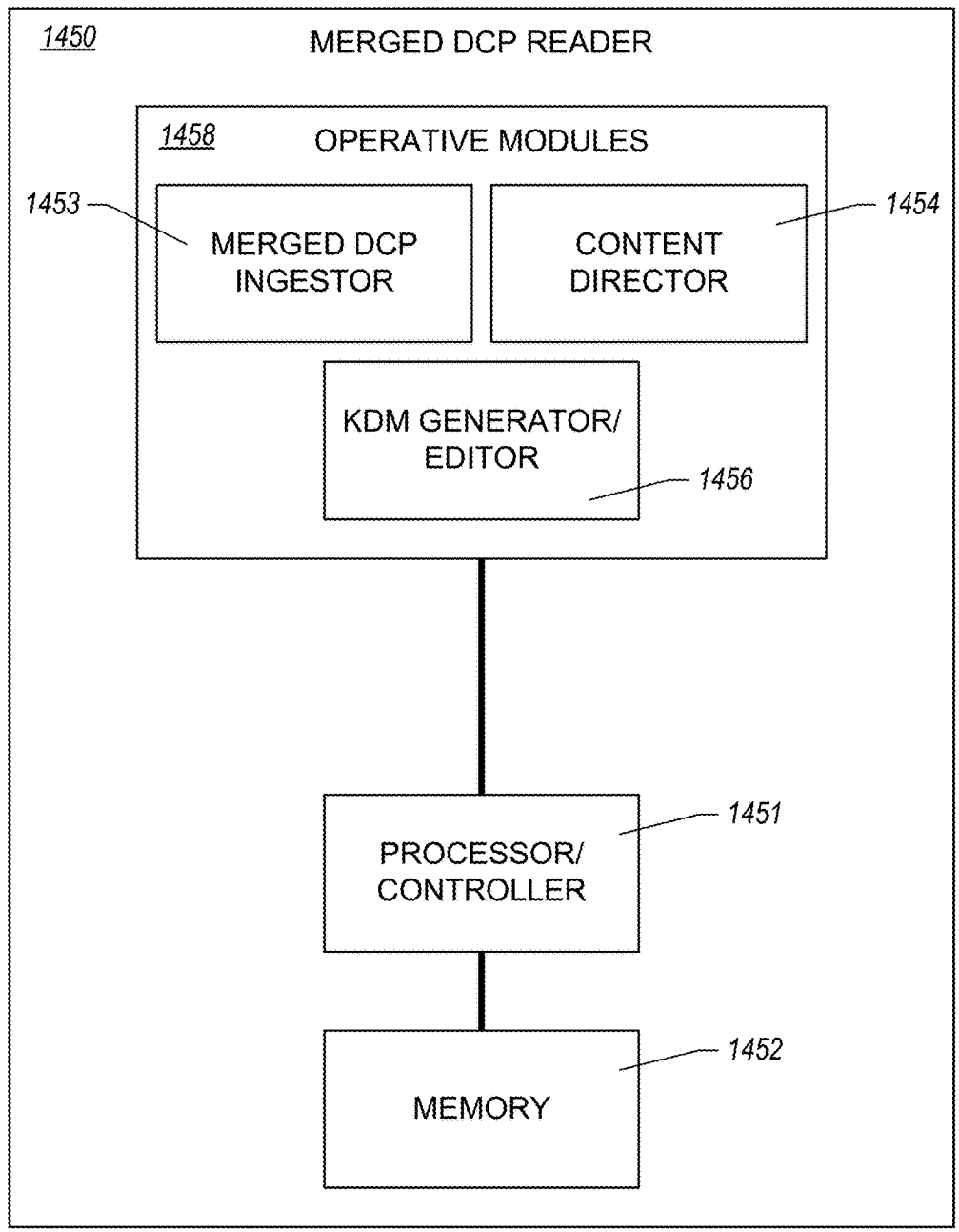
FIG. 17 illustrates a functional block diagram of an example embodiment of a merged DCP reader.

FIG. 17 illustrates a functional block diagram of an example embodiment of a merged DCP reader. Merged DCP reader 1450 may include processor/controller 1451 that controls the basic operations of merged DCP reader 1450. Processor/controller 1451 may be coupled to memory 1452, which may include both read-only memory (ROM) and random access memory (RAM), and may provide instructions and data to processor/controller 1451. A portion of memory 1452 may include non-volatile random access memory (NVRAM). Processor/controller 1451 typically performs logical and arithmetic operations based on program instructions stored within memory 1452. Instructions in memory 1452 may be executable to implement the methods described herein. Operative modules 1458 may be coupled to processor/controller 1451. Data from the components in operative modules 1458 may be processed and/or analyzed by processor/controller 1451 in order to coordinate their functionality. These modules may include, for example, a merged DCP ingestor, a content director, and/or KDM generator/editor. The modules may be implemented in hardware and/or software. For example, the modules may comprise circuit logic hardwired into a system configured to read a merged DCP. The modules may also be soft-coded into a computer program.

Merged DCP ingestor 1453 may be configured to receive a merged DCP and unpack/decode it, wherein the cinema files are extracted from the merged DCP. In some cases, other received files may be used in conjunction with the received merged DCP. For example, the merged D-KDM and/or KDMs and/or certificates and/or other security mechanisms may be used to decode the merged DCP. In some cases, KDMs may be generated by KDM generator editor 1456, as will later be described.

The files for the cinema content may be cinema content for two or more screens, such as in a multi-screen cinema environment. The files may include DCDM files, J2K files, MXF files, and/or any file mentioned in this disclosure. A merged CPL may also be extracted from the merged DCP, wherein the merged CPL lists the cinema content (e.g., files) that should be played on a designated screen at a time. The merged CPL may then be used to direct cinema content for playback on screens.

KDM generator/editor 1456 may have similar functionality to KDM generation application 1101 and/or KDM editor 1106 described above. It may extract KDMs from a merged D-KDM and/or a merged CPL for a merged DCP.

Content director 1454 may route files (e.g., audiovisual assets of the merged DCP) to the designated projectors or projection systems for display on their respective screens (e.g., designated by the merged CPL) for playback. The files may be encoded or decoded. They may also be packaged or unpackaged (e.g., unpackaged by merged DCP ingestor 1453).

Figure 18A:
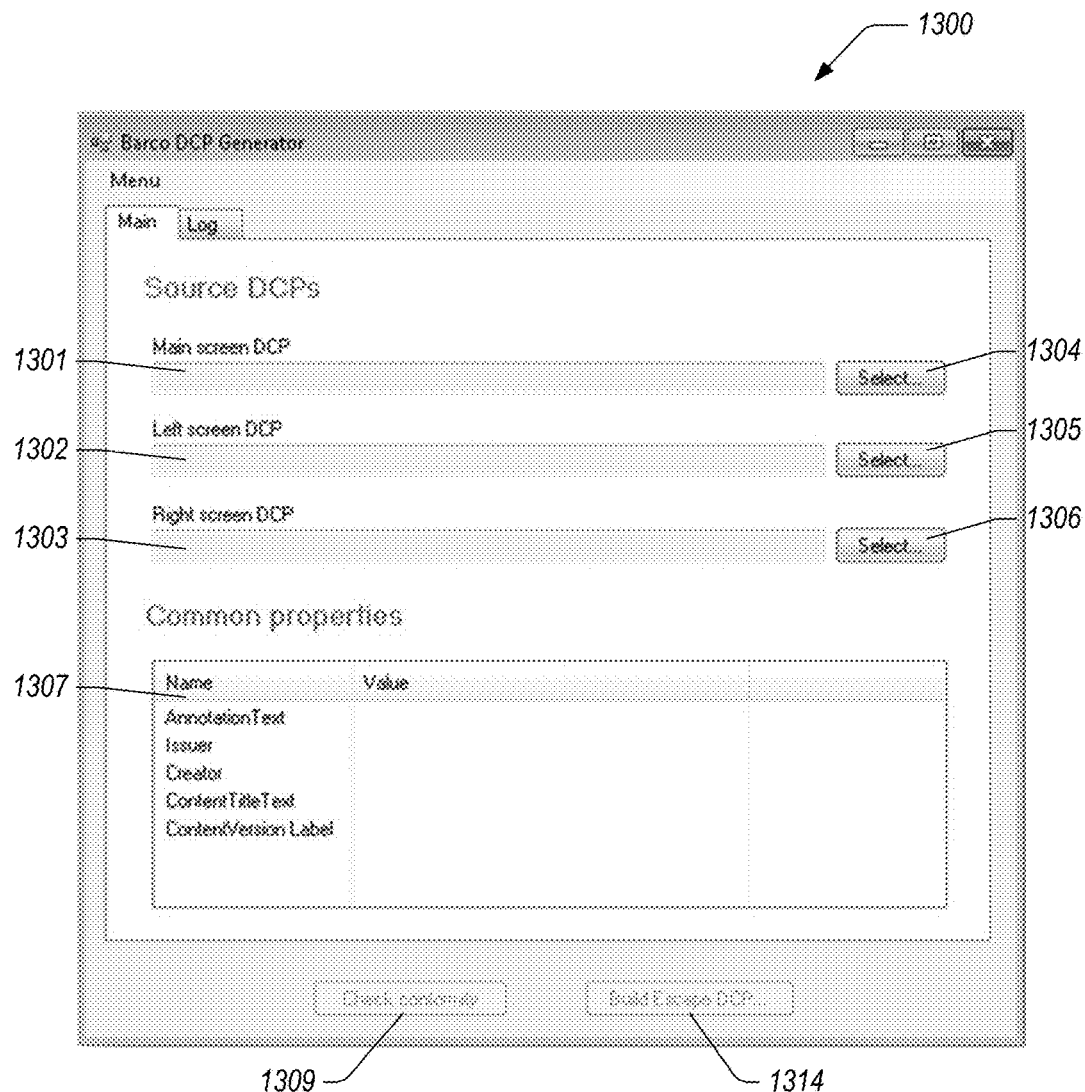
FIGS. 18A-H illustrates an example user interface for a merged DCP generator system.

FIGS. 18A-H illustrates an example user interface for a merged DCP generator system. FIG. 18A illustrates user interface 1300 that allows users to select, combine, and edit source DCPs. For example, user interface 1300 allows users to create a merged DCP from three existing DCPs. Select buttons 1304, 1305, and 1306 may be used to select a main screen DCP, left screen DCP, and right screen DCP, respectively. The file path for the main screen DCP, left screen DCP, and right screen DCP may be displayed on panels 1301, 1302, and 1303, respectively. User interface 1300 may also display numerous common properties in common properties panel 1307. Check conformity button 1309 may be used to check the conformity of the DCPs, which will be later described. Finally, build button 1314 may be used to build the merged DCP.

Figure 18B:
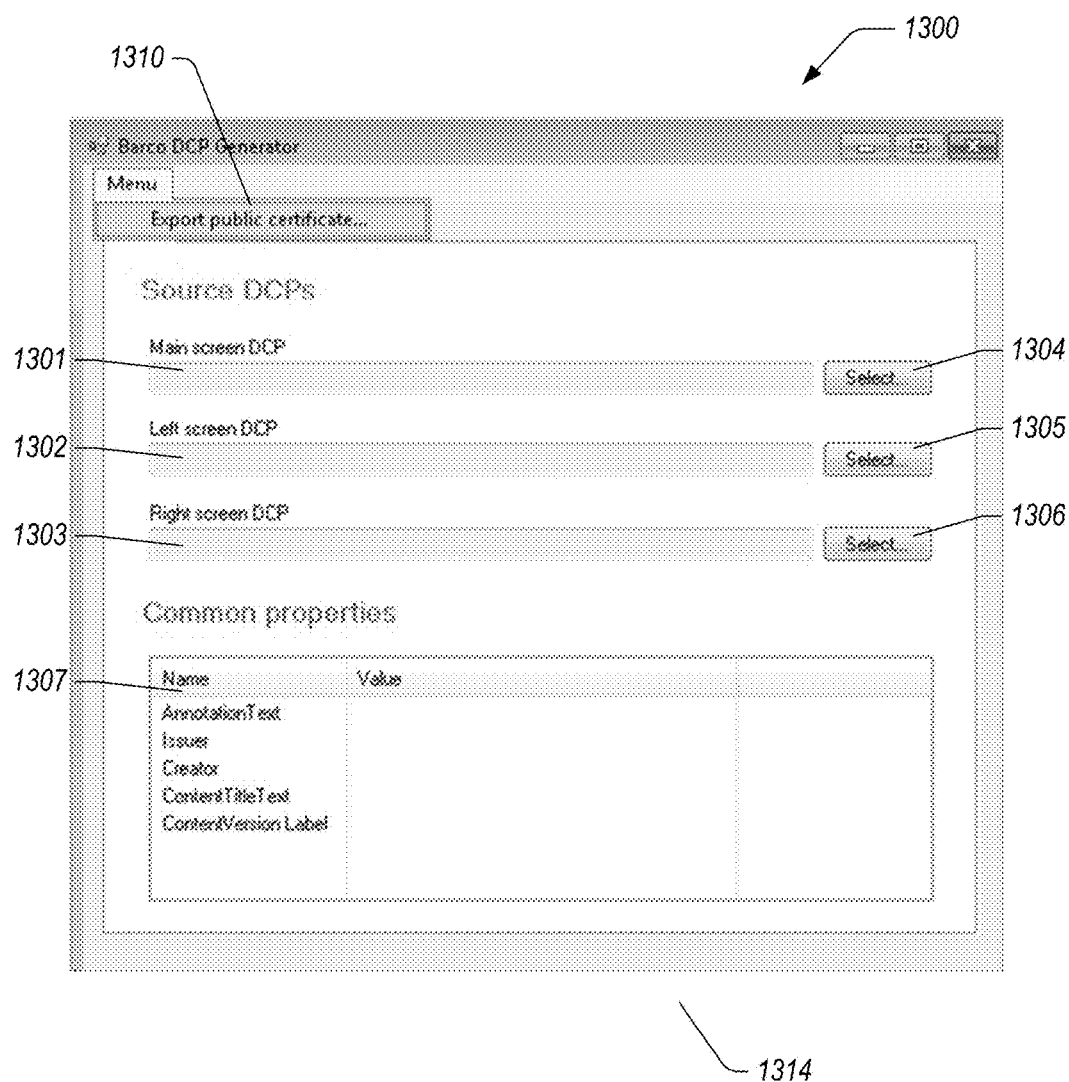

FIG. 18B illustrates an, example export public certificate 1310, which may be selected from a pulldown menu, to embed certificates that may be exported for generating master KDMs that a downstream tool may decrypt. The certificate may be exported using export public certificate 1310.

Figure 18C:
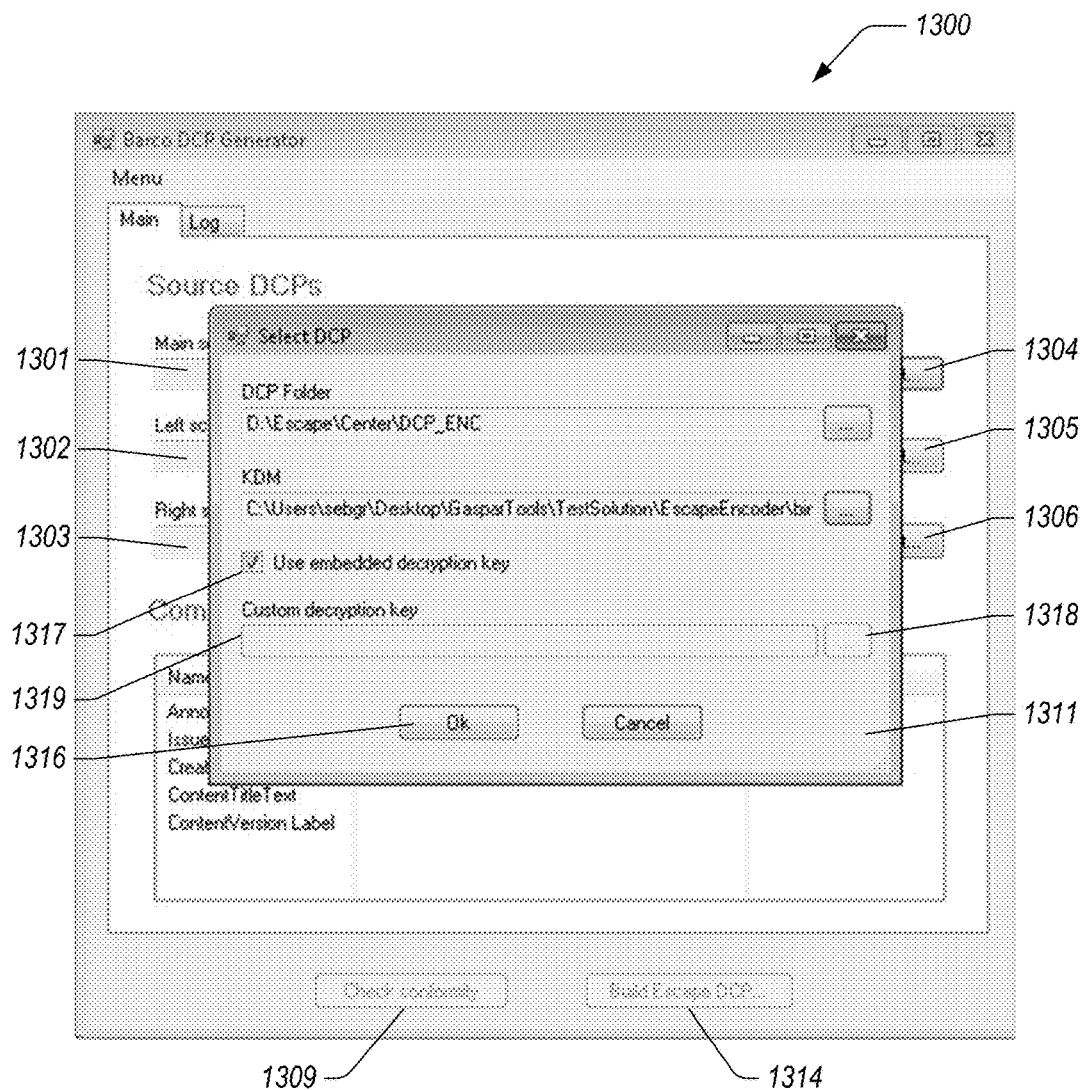

FIG. 18C illustrates an example selection popup box. For example, clicking select button 1304 brings up box 1311, which allows users to select file paths for a DCP, KDM, custom decryption key, and/or to use an embedded decryption key. For example, a DCP folder can be selected that will automatically be parsed. If the content is plaintext, it may be validated by clicking Ok button 1316. If the DCP is encrypted, a KDM may be selected that contains the encrypted keys and/or the decryption key files to decrypt the cipher values in the KDM. In some cases, the "use embedded decryption key" box 1317 may be checked, which allows the merged DCP generation system to use its embedded key. However, if box 1317 is unchecked, a custom decryption key may be chosen using selection button 1318 to enter a file path that will be displayed in panel 1319. Such may be desirable when the KDM has been created for another key.

Figure 18D:
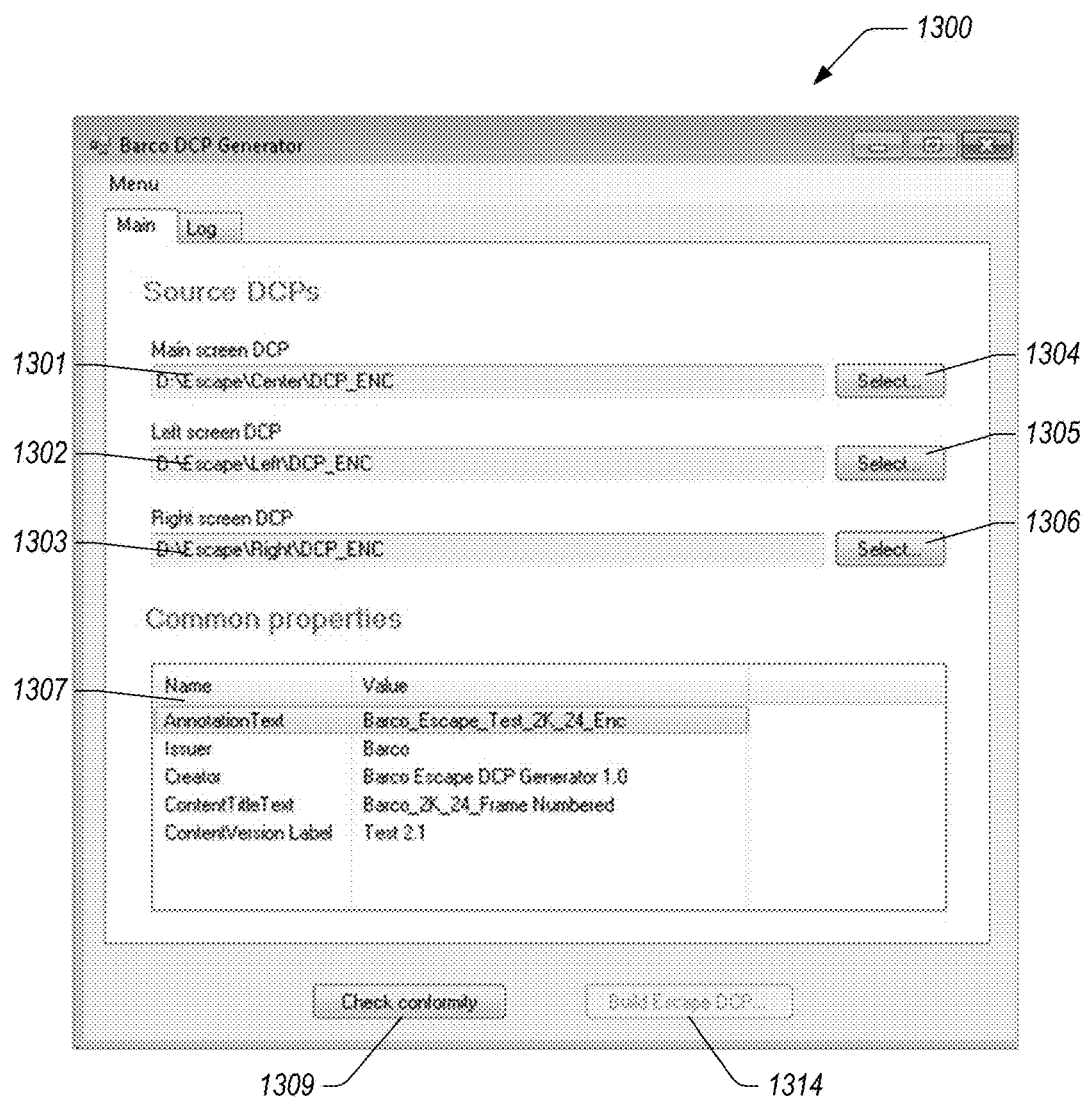

FIG. 18D illustrates editing properties in the common properties panel. In some cases, common properties panel 1307 allows a user to select and edit DCP properties. For example, annotation text, issue, creator, content title text, and content version label may be viewed and/or edited. Check conformity button 1309 may be used to check the conformity of the DCPs. For example, the merged DCP generator system may have certain constraints that will create errors and/or warnings if not met. The errors/warnings may be a result of any desirable conformity of the DCPs, such as any of the constraints and conformities mentioned in this disclosure. For example, a merged DCP generator may require that the selected main screen DCP, left screens DCP, and right screen DCP have compatible characteristics for merger. By way of illustration, these DCPs may not be compatible if they do not have: an equal number of reels, the same total duration and same reel durations, the same edit rates, and/or the same frame rates. In such a case, the merged DCP generator may not merge the selected main screen DCP, left screen DCP, and right screen DCP. In some embodiments, check conformity button 1309 may also initiate other checks such as whether each asset referenced in the PKLs and AMs of a main screen DCP and/or extended screens DCPs (e.g., left screen DCP and right screen DCP) are not present. If the assets are not present, the merged DCP generator may not proceed with merging the DCPs. Additionally, check conformity button 1309 may also produce errors when not all the asset keys needed to decrypt cinema content are present.

Figure 18E:
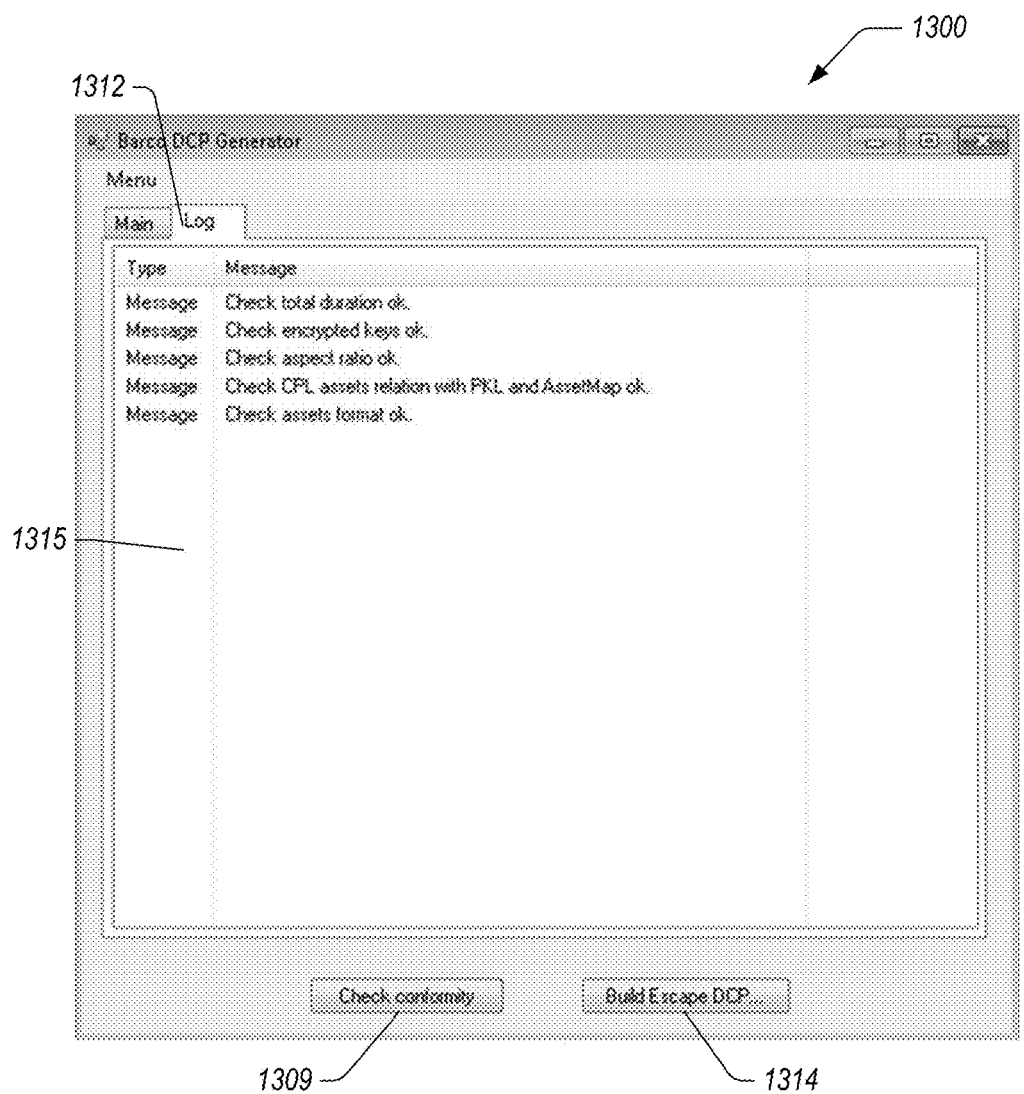

FIG. 18E illustrates an example log showing the status of conformity checks. For example, when check conformity button 1309 is pressed, log tab 1312 may be selected. Log tab 1312 has log panel 1315, which shows the status of each check. For example, it may display if the check is ok or causes an error/warning. In some cases, if no error is found, build button 1314 will be activated to allow the user to build a merged DCP.

Figure 18F:
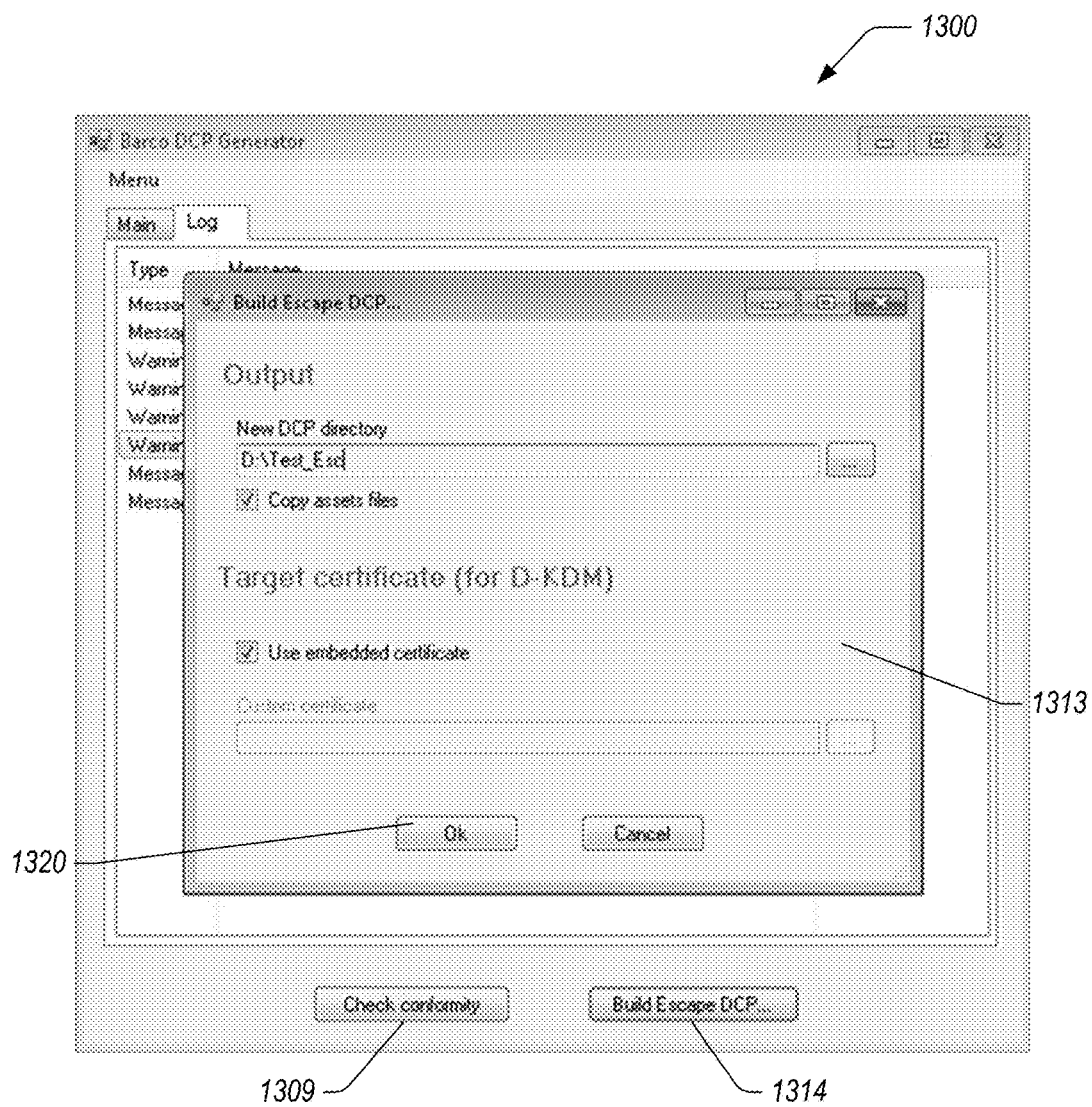

FIG. 18F illustrates an example popup box for selecting the output directory for a built merged DCP. In some embodiments, output directory popup 1313 allows a user to select or deselect whether copy asset files will be stored on a content library where the merged DCP is also stored. Storing the asset files in this way may reduce the time to create the merged DCP and the space occupied in the library. If the content is encrypted, a target certificate may be selected for KDM generation. The certificate may be the embedded certificate or a custom certificate from a directory location. Ok button 1320 may be selected to begin outputting the merged DCP.

Figure 18G:
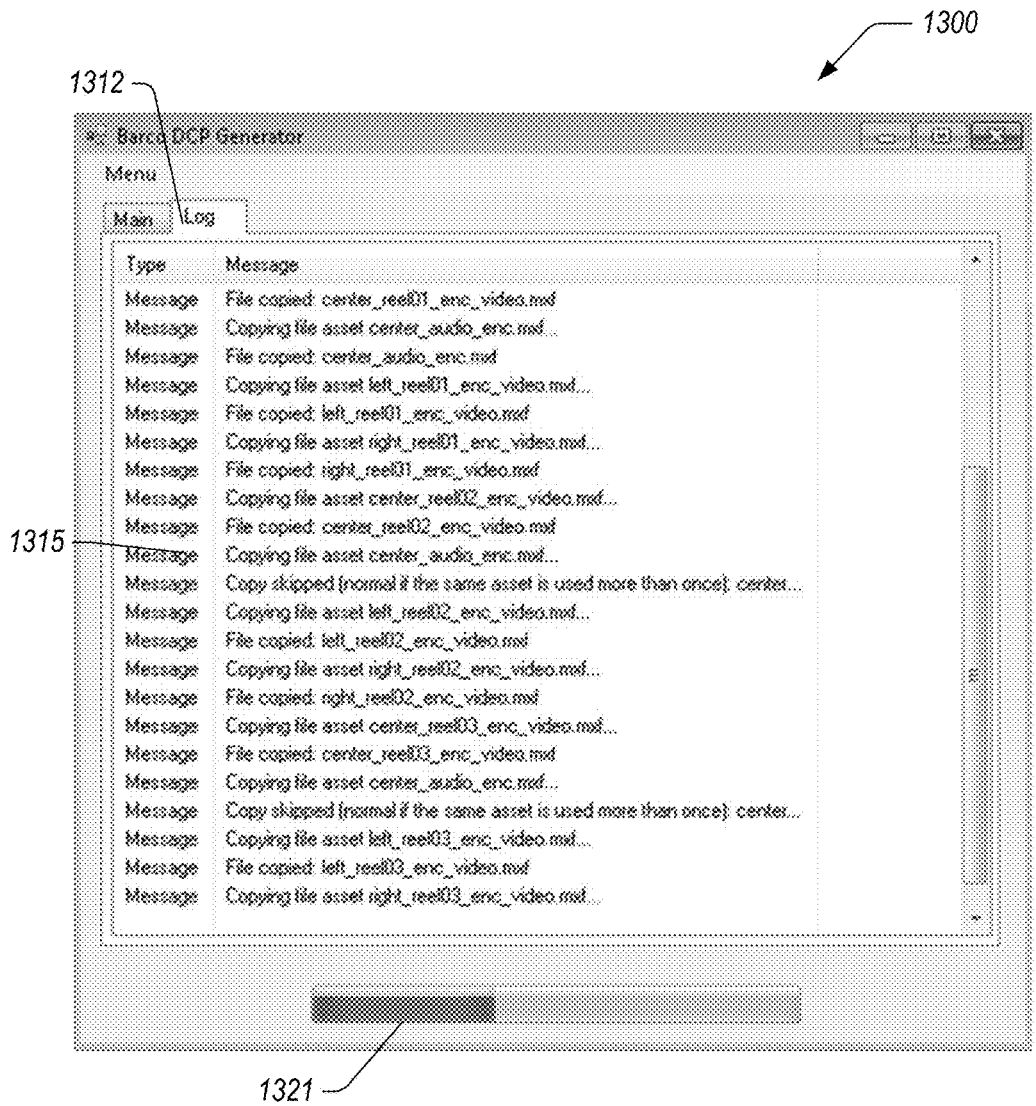

FIG. 18G illustrates an example log and progress bar for merged DCP creation. Log panel 1315 may display the status of one or more steps of the creation of the merged DCP. For example, it may show if the one or more steps were performed, and/or if there was an error and/or warning. Progress bar 1321 may show the approximate relative progress of the merged DCP creation. For example, in some cases, the percentage of progress bar 1321 that is one color may be proportional to the amount of time remaining for the creation of the merged DCP. In other cases, it may show the percentage of the number of steps remaining for the creation of the merged DCP. In other cases, it may be proportional to the file size still remaining to be created.

Figure 18H:
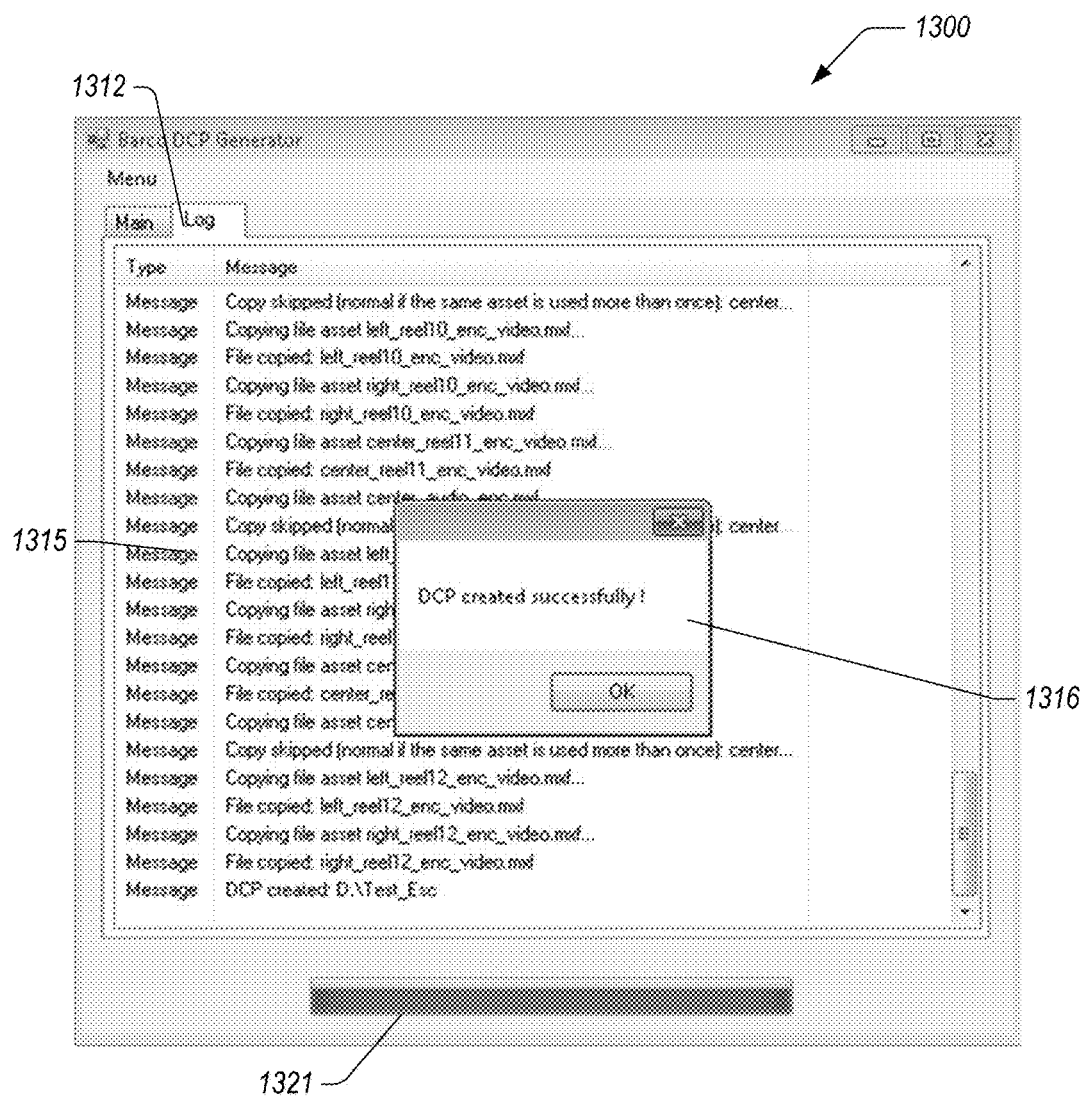

FIG. 18H illustrates an example popup box showing that the merged DCP has been created. For example, popup box 1316 states that the DCP has been created successfully. In some cases, the DCP is now created in the new folder. In that folder, certain files may be designated certain names for identification. For example, the CPL may be named "uuid-.cpl.xml" where uuid is the I.D. of the CPL. The PKL may be named "uuid.pkl.xml" where uuid is the I.D. of the PKL. The KDM may be named "uuid.kdm.xml" where uuid is the I.D. of the KDM. The asset files may be named "uuid.fileType" where uuid is the I.D. of the asset. And the Asset Map may be named ASSETMAP.xml. A person having ordinary skill in the art should appreciate that the above names are given as illustrative examples, and that any name/naming convention and/or identifier may be used for files, so long as servers and/or programs can identify those files.

The files (e.g., DCPs, DCDMs, D-KDMs, KDMs, MXFs, J2K, etc.) as described throughout this disclosure may be transmitted and/or delivered through conventional cabling, including, for example, HDMI cables, component cables, composite video cables, coaxial cables, Ethernet cables, optical signal cables, other video cables, or any combination of these. In some embodiments, the files may be digital information stored on a readable medium, including hard disks, SSDs, optical discs, flash memory devices, and the like. For example, files may be stored on a CRU DX115, CRU DCmini, and/or other hard drives for digital movie distribution.

Numbered Example Embodiments

The following numbered example embodiments are intended to illustrate certain combinations of features as disclosed herein. However, these examples are not intended to demonstrate the full scope of combinations encompassed by the disclosure here. Additionally, other combinations are possible that are not included in the below example embodiments.

1. A merged digital cinema package ("DCP") generation system comprising:
   a DCP ingestor module configured to receive and decode a main screen DCP and a peripheral screen DCP;
   a DCP editor module configured to combine files of the main screen DCP and the peripheral screen DCP to generate a merged composition playlist ("CPL") comprising reels designating cinema content shown on each of the main screen and the peripheral screen; and
   a DCP mastering and packaging module configured to generate a merged DCP from the combined files and the merged CPL.

2. The system of embodiment 1, wherein the main screen DCP is encoded with an encryption key stored in a digital key distribution master ("D-KDM").

3. The system of embodiment 2, wherein the peripheral screen DCP is encoded with an encryption key stored in a D-KDM.

4. The system of embodiment 3, wherein decoding the main screen DCP and the peripheral screen DCP comprises receiving the D-KDM of the main screen and the D-KDM of the peripheral screen with a D-KDM editor module.

5. The system of embodiment 4, wherein generating a merged DCP comprises generating a merged D-KDM based on at least the D-KDM of the main screen and the D-KDM of the peripheral screen.

6. The system of embodiment 1, wherein the merged CPL designates cinema content to reels based on at least one of time codes, reel numbers, and frame numbers.

7. The system of embodiment 1, wherein the CPL designates cinema content shown on each of the main screen and the peripheral screen using a file naming convention.

8. The system of embodiment 7, wherein the file naming convention has different identifiers for the main screen and the peripheral screen.

9. A method for generating a merged digital cinema packages ("DCP") comprising:
   decoding a main screen DCP and a peripheral screen DCP;
   combining files of the main screen DCP and the peripheral screen DCP;
   generating a merged composition playlist ("CPL") comprising reels designating cinema content shown on each of the main screen and the peripheral screen; and
   generating a merged DCP from the combined files and the merged CPL.

10. The method of embodiment 9, wherein the main screen DCP is encoded with an encryption key stored in a digital key distribution master ("D-KDM").

11. The method of embodiment 10, wherein the peripheral screen DCP is encoded with an encryption key stored in a D-KDM.

12. The method of embodiment 11, wherein decoding the main screen DCP and the peripheral screen DCP comprises receiving the D-KDM of the main screen and the D-KDM of the peripheral screen.

13. The method of embodiment 12, wherein generating a merged DCP comprises generating a merged D-KDM based on at least the D-KDM of the main screen and the D-KDM of the peripheral screen.

14. The method of embodiment 9, wherein the merged CPL designates cinema content to reels based on at least one of time codes, reel numbers, and frame numbers.

15. The merged DCP generation system of embodiment 9, wherein the CPL designates cinema content shown on each of the main screen and the peripheral screen using a file naming convention.

16. The merged DCP generation system of embodiment 15, wherein the file naming convention has different identifiers for the main screen and the peripheral screen.

17. A merged digital cinema package ("DCP") delivery device comprising:
a non-transitive memory configured to store a merged DCP comprising audiovisual assets of a main screen DCP and a peripheral screen DCP, and a merged composition playlist ("CPL") configured to designate the audiovisual assets to be played on each of the main screen and the peripheral screen.

18. The device of embodiment 17, wherein the merged DCP is encoded such that the audiovisual assets may be decoded by encryption keys.

19. The device of embodiment 18, further comprising a merged digital key distribution master ("D-KDM") comprising encryption keys to decode the audiovisual assets of the merged DCP.

20. A merged digital cinema package ("DCP") ingestion system comprising:
a KDM generation module configured to receive a merged digital key distribution master ("D-KDM") and generate key delivery mechanisms ("KDMs") having encryption keys; and
a merged DCP ingestor module configured to receive a merged DCP and decode the merged DCP using the encryption keys, wherein the DCP ingestor further extracts a merged composition playlist ("CPL") configured to designate the audiovisual assets to be played on each of a main screen and a peripheral screen.

21. The system of embodiment 20, wherein the merged DCP ingestor further routes audiovisual assets to the main screen and the peripheral screen.

22. A method of ingesting a merged digital cinema package ("DCP") comprising:
receiving a merged digital key distribution master ("D-KDM") and a merged DCP;
generating key delivery mechanisms ("KDMs") having encryption keys from the D-KDM;
decoding the merged DCP using the encryption keys; and
extracting a merged composition playlist ("CPL") configured to designate the audiovisual assets to be played on each of a main screen and a peripheral screen.

23. The method of embodiment 22, further comprising routing the audiovisual assets to the main screen and the peripheral screen.

24. A projector system comprising:
a main projector configured to project an image onto a main screen;
a peripheral projector configured to project an image onto a peripheral screen; and
a distribution system configured to receive a merged digital cinema package ("DCP"), extract audiovisual assets from the merged DCP, and transmit the audiovisual assets to the main projector and the peripheral projector based on at least a merged composition playlist ("CPL"), wherein the CPL is configured to designate the audiovisual assets to be played by each of the main projector and the peripheral projector.

25. A method for transmitting cinema content for multiple screens comprising:
receiving a merged digital cinema package ("DCP");
extracting audiovisual assets from the merged DCP; and
transmitting the audiovisual assets to the main projector and the peripheral projector based on at least a merged composition playlist ("CPL"), wherein the CPL is configured to designate the audiovisual assets to be played by each of the main projector and the peripheral projector.

In some embodiments, a computing system that has components including a central processing unit ("CPU"), input/output ("I/O") components, storage, and memory may be used to execute the projector system, or specific components of the projector system. The executable code modules of the projector system can be stored in the memory of the computing system and/or on other types of non-transitory computer-readable storage media. In some embodiments, the projector system may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A merged digital cinema package ("DCP") generation system comprising:
    a DCP ingestor module configured to receive and decode a main screen DCP and a peripheral screen DCP, the main screen DCP comprising digital files that include audiovisual information and metadata to enable the presentation of audiovisual content on a main screen and the peripheral screen DCP comprising digital files that include audiovisual information and metadata to enable the presentation of audiovisual content on a peripheral screen adjacent to the main screen, wherein the ingestor module is further configured to extract the digital files of the main screen DCP as part of decoding of the main screen DCP and separately extract the digital files of the peripheral screen DCP as part of decoding of the peripheral screen DCP;
    a DCP editor module configured to combine the digital files of the main screen DCP and the digital files of the peripheral screen DCP to generate a merged composition playlist ("CPL") comprising a plurality of reels designating audiovisual content shown on the main screen and the peripheral screen, each reel comprising audiovisual content to be displayed on the main screen and audiovisual content to be displayed on the peripheral screen in synchronization with the audiovisual content to be displayed on the main screen; and
    a DCP mastering and packaging module configured to generate a merged DCP from the combined digital files and the merged CPL.

2. The system of claim 1, wherein the main screen DCP is encoded with an encryption key stored in a digital key distribution master ("D-KDM").

3. The system of claim 2, wherein the peripheral screen DCP is encoded with an encryption key stored in a D-KDM.

4. The system of claim 3, wherein generating a merged DCP comprises generating a merged D-KDM based on at least the D-KDM of the main screen and the D-KDM of the peripheral screen.

5. The system of claim 1, wherein the merged CPL designates audiovisual content to reels based on at least one of time codes, reel numbers, or frame numbers.

6. The system of claim 5, wherein the file naming convention has different identifiers for the main screen and the peripheral screen.

7. A method for generating a merged digital cinema packages ("DCP") comprising:
    decoding a main screen DCP and a peripheral screen DCP, the main screen DCP comprising digital files that include audiovisual information and metadata to enable the presentation of audiovisual content on a main screen and the peripheral screen DCP comprising digital files that include audiovisual information and metadata to enable the presentation of audiovisual content on a peripheral screen adjacent to the main screen, wherein decoding further comprises extracting the digital files of the main screen DCP as part of decoding of the main screen DCP and separately extract the digital files of the peripheral screen DCP as part of decoding of the peripheral screen DCP;
    combining the digital files of the main screen DCP and the digital files of the peripheral screen DCP;
    generating a merged composition playlist ("CPL") comprising a plurality of reels designating audiovisual content shown on each of the main screen and the peripheral screen, each reel comprising audiovisual content to be displayed on the main screen and audiovisual content to be displayed on the peripheral screen in synchronization with the audiovisual content to be displayed on the main screen; and
    generating a merged DCP from the combined digital files and the merged CPL.

8. The method of claim 7, wherein the main screen DCP is encoded with an encryption key stored in a digital key distribution master ("D-KDM").

9. The method of claim 8, wherein the peripheral screen DCP is encoded with an encryption key stored in a D-KDM.

10. The method of claim 9, wherein decoding the main screen DCP and the peripheral screen DCP comprises receiving the D-KDM of the main screen and the D-KDM of the peripheral screen.

11. The method of claim 10, wherein generating a merged DCP comprises generating a merged D-KDM based on at least the D-KDM of the main screen and the D-KDM of the peripheral screen.

12. A projector system comprising:
    a main projector configured to project an image onto a main screen;
    a peripheral projector configured to project an image onto a peripheral screen; and
    a distribution system configured to:
        receive a merged digital cinema package ("DCP"), the merged DCP comprising combined digital files from a main screen DCP and a peripheral screen DCP along with a merged composite playlist ("CPL"), the combined digital files including audiovisual information and metadata to enable the presentation of audiovisual content by the main projector on a main screen and audiovisual information and metadata to enable the presentation of audiovisual content by the peripheral projector on a peripheral screen adjacent to the main screen, and the merged CPL comprising a plurality of reels designating audiovisual content for presentation by the main projector and the peripheral projector;

extract the audiovisual information for presentation by the main projector and the audiovisual information for presentation by the peripheral projector from the merged DCP; and transmit the audiovisual information for presentation by the main projector and the audiovisual information for presentation by the peripheral projector to the main projector and the peripheral projector, respectively, based on at least the merged CPL, wherein each real of the merged CPL comprises audiovisual information to be projected by the main projector on to the main screen and audiovisual information to be projected by the peripheral projector on to the peripheral projector in synchronization with the audiovisual content to be projected by the main projector.

\* \* \* \* \*